(12) United States Patent
Kang et al.

(10) Patent No.: US 10,704,730 B2
(45) Date of Patent: Jul. 7, 2020

(54) SMALL-SIZED CAMERA GIMBAL AND ELECTRONIC DEVICE HAVING SAME

(71) Applicant: SAMSUNG ELECTRONICS CO., LTD., Suwon-si, Gyeonggi-do (KR)

(72) Inventors: Yoon-Seok Kang, Seoul (KR); Chanyoung Moon, Hwaseong-si (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 42 days.

(21) Appl. No.: 16/060,488

(22) PCT Filed: Nov. 21, 2016

(86) PCT No.: PCT/KR2016/013397
§ 371 (c)(1),
(2) Date: Jun. 8, 2018

(87) PCT Pub. No.: WO2017/099389
PCT Pub. Date: Jun. 15, 2017

(65) Prior Publication Data
US 2018/0363838 A1    Dec. 20, 2018

(30) Foreign Application Priority Data

Dec. 9, 2015    (KR) .......................... 10-2015-0174949

(51) Int. Cl.
*F16M 11/12* (2006.01)
*B64D 47/08* (2006.01)
(Continued)

(52) U.S. Cl.
CPC ......... *F16M 11/123* (2013.01); *B64C 39/024* (2013.01); *B64D 47/08* (2013.01);
(Continued)

(58) Field of Classification Search
CPC ................. F16M 11/123; F16M 11/18; F16M 2200/041; G03B 17/561; G03B 15/006;
(Continued)

(56) References Cited

U.S. PATENT DOCUMENTS 5,907,730 A    5/1999  Tseng et al.
6,707,619 B1 *  3/2004  Okuno ............. G08B 13/19632
                                            348/E7.085
(Continued)

FOREIGN PATENT DOCUMENTS

CN            1254856       5/2000
CN         202392374 U      8/2012
(Continued)

OTHER PUBLICATIONS

International Search Report for PCT/KR2016/013397, dated Feb. 16, 2017, 4 pages.
(Continued)

*Primary Examiner* — Lin Ye
*Assistant Examiner* — Tuan H Le
(74) *Attorney, Agent, or Firm* — Nixon & Vanderhye, P.C.

(57) ABSTRACT

A camera gimbal is disclosed. The disclosed camera gimbal comprises: a pitching housing, in which a lens part is disposed, rotating around a first axis; a yawing housing rotating around a second axis vertical to the first axis, and to which the pitching housing is coupled so as to be rotatable around the second axis; and a rolling housing rotating around a third axis vertical to the first and second axes, and to which the yawing housing is coupled so as to be rotatable around the third axis, wherein the first and second axes can cross at a right angle, the second and third axes can cross at a right angle, the first and third axes can be spaced from each other in a state in which the first and third axes can cross at (Continued)

a right angle, and the first and third axes can be arranged on the same plane. In the present invention, various examples are possible.

7 Claims, 34 Drawing Sheets

(51) Int. Cl.
  *G03B 15/00* (2006.01)
  *F16M 11/18* (2006.01)
  *B64C 39/02* (2006.01)
  *G03B 17/56* (2006.01)

(52) U.S. Cl.
  CPC ............ *F16M 11/18* (2013.01); *G03B 15/006* (2013.01); *G03B 17/561* (2013.01); *B64C 2201/127* (2013.01); *F16M 2200/041* (2013.01)

(58) Field of Classification Search
  CPC .. B64C 39/024; B64C 2201/127; B64D 47/08
  See application file for complete search history.

(56) References Cited

U.S. PATENT DOCUMENTS

| | | | |
|---|---|---|---|
| 10,334,171 B2 | 6/2019 | Wang et al. | |
| 2001/0051509 A1 | 12/2001 | Mukai et al. | |
| 2002/0130230 A1 | 9/2002 | Ursan et al. | |
| 2005/0277388 A1 | 12/2005 | Kim et al. | |
| 2006/0263082 A1 | 11/2006 | Brown | |
| 2009/0052037 A1 | 2/2009 | Wernersson | |
| 2010/0019120 A1* | 1/2010 | Burnham | F16M 11/123 248/550 |
| 2011/0006170 A1 | 1/2011 | Liu et al. | |
| 2011/0103782 A1 | 5/2011 | Tsuruta et al. | |
| 2011/0150442 A1 | 6/2011 | Ollila et al. | |
| 2011/0262121 A1 | 10/2011 | Yanagisawa et al. | |
| 2013/0048792 A1 | 2/2013 | Szarek et al. | |
| 2014/0354689 A1* | 12/2014 | Lee | A61B 1/00045 345/633 |
| 2015/0077614 A1* | 3/2015 | King | G03B 17/561 348/311 |
| 2016/0171330 A1* | 6/2016 | Mentese | G06K 9/3233 348/170 |

FOREIGN PATENT DOCUMENTS

| | | |
|---|---|---|
| CN | 203941368 U | 11/2014 |
| CN | 104903790 | 9/2015 |
| EP | 2 759 480 | 7/2014 |
| JP | 2001-352380 | 12/2001 |
| JP | 2003-143270 | 5/2003 |
| KR | 10-2005-0117087 | 12/2005 |
| KR | 10-2008-0017311 | 2/2008 |
| KR | 10-1043637 | 6/2011 |
| KR | 10-2011-0079108 | 7/2011 |
| KR | 10-2015-0014078 | 2/2015 |
| WO | 2015/162247 | 10/2015 |

OTHER PUBLICATIONS

Written Opinion of the ISA for PCT/KR2016/013397, dated Feb. 16, 2017, 12 pages.
Extended Search Report dated Nov. 15, 2018 in counterpart European Patent Application No. EP16873255.0.
Honic, Zach, "Sony DSC-QX100 and QX10 lens cameras bring top-notch optics to any smartphone or tablet, we go hands-on (video)," Sep. 4, 2013, pp. 1-5, www.engadget.com, retrieved from the Internet Nov. 7, 2018.
First Office Action dated Oct. 24, 2019 in counterpart Chinese Application No. CN201680072282.3 and English-language translation.

\* cited by examiner

SMALL-SIZED CAMERA GIMBAL AND ELECTRONIC DEVICE HAVING SAME

This application is the U.S. national phase of International Application No. PCT/KR2016/013397 filed 21 Nov. 2016, which designated the U.S. and claims priority to KR Patent Application No. 10-2015-0174949 filed 9 Dec. 2015, the entire contents of each of which are hereby incorporated by reference.

TECHNICAL FIELD

Various embodiments of the present disclosure relate to a three-axis adjustment photographing apparatus which is capable of photographing with a camera at various angles.

BACKGROUND ART

With the development of electronic devices provided with a communication function and the development of camera modules, technologies for pixels and image quality are developing to satisfy consumers' desires for photographing. In addition, there are various demands for technology for mounting camera modules on unmanned air vehicles such as drones and technology for gimbals for photographing moving images.

Most of related-art horizontality maintaining photographing apparatuses (hereinafter, gimbals) are designed to perform two-axis adjustment or three-axis adjustment. The number of driving units may be determined according to the number of adjustment axes. For example, a rotation about a Y-axis may be defined as yawing, an X-axis adjustment may be defined as pitching, and a Z-axis adjustment may be defined as rolling.

Driving units may be provided for respective axes and may operate to maintain horizontality. A rotation axis is involved in a rotary motion of the next axis at each step.

Related-art technology is designed to have a structure having a separate camera mounted on a gimbal, and to have the camera mounted at the end of a final rotation shaft.

A big-sized camera mounting gimbal has shaft supports formed at both ends thereof, whereas a small-sized camera gimbal uses only a portion where a driving unit is disposed as a rotation axis.

DISCLOSURE OF INVENTION

Technical Problem

However, according to related-art technology, it is impossible to apply a camera mounting gimbal to a subminiature camera module, and a drone using a subminiature lens has no gimbal function.

Related-art gimbals have normal cameras mounted thereon and uses the same, and are large and expensive, and are heavy due to the use of a brushless motor. Therefore, drones for flying should be large so as to be able to stably fly and photograph.

In addition, most of the related-art gimbals have upper sides attached to a main body of an air vehicle, and have a pitching axis, a rolling axis, and a yawing axis with reference to a camera as driving axes.

In this case, when the rolling axis is rotated by 90 degrees, the yawing axis and the pitching axis meet in the same axis direction, and an axis for adjusting as the pitching axis disappears and thus the function of the gimbal fails.

Due to the above-mentioned problem, a camera rotation about the rolling axis is limited to +40 degrees to −45 degrees when the unmanned air vehicle flies. Therefore, the related-art gimbal cannot photograph in a vertical direction.

Various embodiments of the present disclosure integrate a small-sized camera module and a gimbal function, and make it possible to photograph a high quality image, similar to an image that is photographed by using a big-sized gimbal, a big-sized camera, and a big-sized unmanned air vehicle (for example, a drone), at a low cost and with a light weight by using a small-sized unmanned air vehicle.

Various embodiments of the present disclosure provide a camera gimbal which is mounted on an unmanned air vehicle and is capable of photographing in a vertical direction, and prevents driving axes from overlapping one another in photographing in the vertical direction, and simultaneously, is capable of photographing a lower side at 90 degrees in a normal state.

Various embodiments of the present disclosure make it possible to set three photographing directions and to rotate by 360 degrees.

Solution to Problem

According to various embodiments of the present disclosure, a camera gimbal may includes: a pitching housing having a lens unit disposed therein and rotating around a first axis; a yawing housing rotating around a second axis perpendicular to the first axis, and to which the pitching housing is coupled so as to be rotatable around the second axis; and a rolling housing rotating around a third axis perpendicular to the first and second axes, and to which the yawing housing is coupled so as to be rotatable around the third axis, wherein the first and second axes cross at a right angle to each other, the second and third axes cross at a right angle to each other, the first and third axes are spaced apart from each other in a state in which the first and third axes cross at a right angle to each other, and the first and third axes are arranged to be coplanar with each other.

According to various embodiments of the present disclosure, a three-axis gimbal may include; a pitching housing comprising a lens unit and comprising a cylindrical portion formed on at least a portion thereof; a yawing housing comprising a spheric portion formed on at least a portion thereof; a rolling housing comprising a hollow formed in at least a portion thereof; and a base, wherein the pitching housing is housed in the yawing housing so as to be rotatable around a first axis, the yawing housing is housed in the rolling housing so as to be rotatable around a third axis, and the rolling housing is housed in the base so as to be rotatable around a second axis.

According to various embodiments of the present disclosure, an electronic device may include at least one camera gimbal which is mountable on or dismountable from a connector formed on an exterior of the electronic device, and the camera gimbal may include: a lens housing having an outer circumference surface formed on at least a portion thereof; a yawing housing having an outer circumference surface formed on at least a portion thereof; a rolling housing comprising a cylindrical portion formed on at least a portion thereof; and a main housing, wherein the lens housing is housed in the yawing housing so as to perform a pitching operation, the yawing housing is housed in the rolling housing so as to perform a yawing operation, and the rolling housing is housed in the main housing so as to perform a rolling operation.

According to various embodiments of the present disclosure, an electronic device may include at least one camera gimbal which is mountable on or dismountable from a connector formed on an exterior of the electronic device, and the camera gimbal may include: a holder; a first frame coupled to at least a portion of the holder so as to perform a yawing operation; a second frame coupled to at least a portion of the first frame so as to perform a pitching operation; and at least one lens housing coupled to at least a portion of the second frame so as to perform a rolling operation, wherein at least one yawing driving unit is disposed in the holder to be interlocked with at least a portion of the first frame, at least one pitching driving unit is disposed in the first frame to be interlocked with at least a portion of the second frame, and at least one rolling driving unit is disposed in the second frame to be interlocked with at least a portion of the lens housing.

Advantageous Effects of Invention

The three-axis camera gimbal according to various embodiments of the present disclosure is configured to have a small size and to be light, and thus can be mounted on an unmanned air vehicle such as a drone.

The three-axis camera gimbal according to various embodiments of the present disclosure can photograph a front view and a bottom view.

The three-axis camera gimbal according to various embodiments of the present disclosure can photograph in a horizontal state and a vertical state.

The three-axis camera gimbal according to various embodiments of the present disclosure uses one or more common gears for respective driving units (rolling driving unit, pitching driving unit, yawing driving unit), and thus can reduce the number of components and a manufacturing cost.

The gimbal according to various embodiments of the present disclosure can adjust a photographing direction automatically or manually.

The gimbal according to various embodiments of the present disclosure can photograph at wide angles according to an autorotation of 360 degrees, and can photograph in 3D.

The gimbal according to various embodiments of the present disclosure can be mounted on a connector disposed on an exterior of an electronic device and used therein.

BEST MODE FOR CARRYING OUT THE INVENTION

Figure 1:
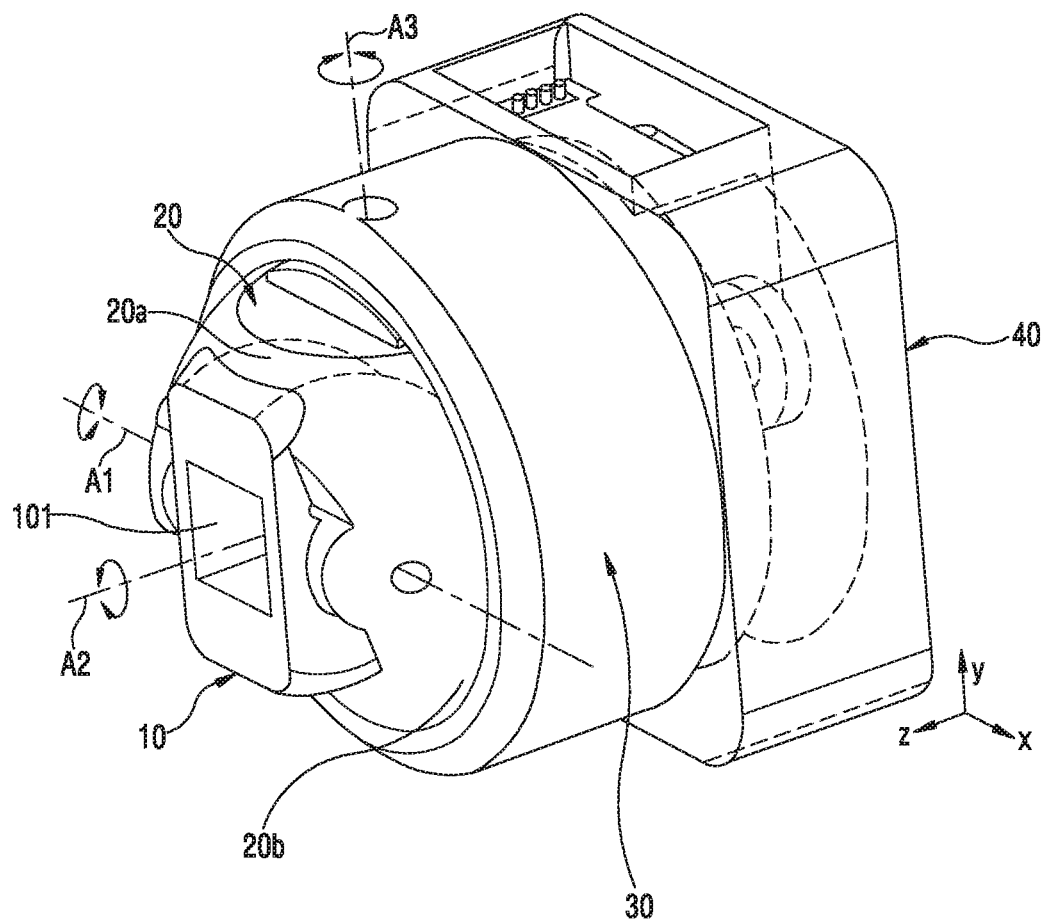
FIG. 1 is a perspective view showing a front surface of a three-axis camera gimbal according to various embodiments of the present disclosure.

Hereinafter, various embodiments of the present invention will be described with reference to accompanying drawings. However, various embodiments of the present invention are not limited to specific embodiments, and it should be understood that modification, equivalent, and/or alternative on the various embodiments described herein can be variously made. With regard to description of drawings, similar components may be marked by similar reference numerals.

In the disclosure disclosed herein, the expressions "have," "may have," "include" and "comprise," or "may include" and "may comprise" used herein indicate existence of corresponding features (for example, elements such as numeric values, functions, operations, or components) and do not preclude the presence of additional features.

In the disclosure disclosed herein, the expressions "A or B," "at least one of A or/and B," or "one or more of A or/and B," and the like used herein may include any and all combinations of one or more of the associated listed items. For example, the term "A or B," "at least one of A and B," or "at least one of A or B" may refer to all of the case (1) where at least one A is included, the case (2) where at least one B is included, or the case (3) where both of at least one A and at least one B are included.

The terms, such as "first," "second," and the like used herein, may refer to various elements of various embodiments of the present invention, but do not limit the elements. For example, such terms do not limit the order and/or priority of the elements. Furthermore, such terms may be used to distinguish one element from another element. For example, "a first user device" and "a second user device" indicate different user devices regardless of the order or priority. For example, without departing from the scope of the present invention, a first element may be referred to as a second element, and similarly, a second element may be referred to as a first element.

It will be understood that when an element (for example, a first element) is referred to as being "(operatively or communicatively) coupled with/to" or "connected to" another element (for example, a second element), it can be directly coupled with/to or connected to another element or coupled with/to or connected to another element via an intervening element (for example, a third element). In contrast, when an element (for example, a first element) is referred to as being "directly coupled with/to" or "directly connected to" another element (for example, a second element), it should be understood that there is no intervening element (for example, a third element).

According to the situation, the expression "configured to (or set to)" used herein may be used as, for example, the expression "suitable for," "having the capacity to," "designed to," "adapted to," "made to," or "capable of". The term "configured to (or set to)" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (for example, an embedded processor) for performing a corresponding operation or a generic-purpose processor (for example, a central processing unit (CPU) or an application processor) which may perform corresponding operations by executing one or more software programs which are stored in a memory device.

Terms used in the present invention are used to describe specified embodiments of the present invention and are not intended to limit the scope of other embodiments. The terms of a singular form may include plural forms unless otherwise specified. Unless otherwise defined herein, all the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal way, unless expressly so defined herein in various embodiments of the present invention. In some cases, even if terms are terms which are defined in the specification, they may not be interpreted to exclude embodiments of the present invention.

Hereinafter, various embodiments of the present disclosure will be described with reference to the accompanying drawings.

FIG. 1 is a perspective view showing a three-axis camera gimbal according to various embodiments of the present disclosure. In the drawing, a Cartesian coordinate system is used. With reference to the drawings, the X-axis refers to a horizontal direction, the Y-axis refers to a vertical direction, and the Z-axis refers to a forward and backward direction. The number of driving units may be determined according to the number of adjustment axes, and a rotation about the Y-axis may be defined as yawing, an X-axis adjustment may be defined as pitching, and a Z-axis adjustment may be defined as rolling.

Referring to FIG. 1, the 3-axis camera gimbal (hereinafter, referred to as a gimbal) according to various embodiments may be an apparatus that is mounted on an unmanned air vehicle such as a drone, and maintains horizontality of a camera lens. In particular, the gimbal according to various embodiments is configured to have a subminiature size and to be light, and may be mounted on a small-sized drone. In addition, the gimbal according to various embodiments may precisely control to maintain horizontality of a photographing apparatus such as a camera along three axes.

The gimbal according to various embodiments may photograph a front image in an initial state, and may rotate downwards by 90 degrees and photograph a lower side image. In addition, the gimbal according to various embodiments may photograph an image in a horizontal state and an image in a vertical state.

The gimbal according to various embodiments may include a pitching housing 10, a yawing housing 20, a rolling housing 30, and a plurality of driving units. The plurality of driving units may include a rolling driving unit which provides a force for rotating the rolling housing 30, a pitching driving unit 120 which provides a force for rotating the pitching housing 10, and a yawing driving unit 220 which provides a force for rotating the yawing housing 20. The driving units mentioned above may be indicated by other terms such as driving devices, driving modules, driving sources, etc. The gimbal mentioned above may be indicated by other terms such as a horizontality stabilizing apparatus, a horizontality adjustment apparatus, a stabilizer, etc.

Each of the driving units according to various embodiments may be connected to a main printed circuit board (not shown) via a flexible printed circuit board (FPCB) (not shown). The FPCB (not shown) may be mounted in the gimbal in such a manner that its inflection point is moved.

The gimbal according to various embodiments may include the pitching housing 10 which rotates around a first axis A1. The first axis A1 may be defined as a pitching axis. The pitching housing 10 according to various embodiments may have an opening 101 formed on a front surface thereof. The opening 101 may be a space through which a second axis A2 penetrates in a forward and backward direction (Z-axis).

The yawing housing 20 according to various embodiments may rotate around a third axis A3 perpendicular to the first axis A1, and the pitching housing may be coupled to the yawing housing 20 so as to be rotatable around the first axis A1. The third axis A3 may be defined as a yawing axis. The yawing housing according to various embodiments may include a substantially hemispheric portion. The hemispheric portion of the yawing housing 20 may be configured to have a diameter enough to house the pitching housing 10 and to rotate.

The rolling housing 30 according to various embodiments may rotate around a second axis perpendicular to the first and third axes A1, A3, and the yawing housing 20 may be coupled to the rolling housing 30 so as to be rotatable around the third axis A3. The second axis A2 may be defined as a rolling axis.

The gimbal according to various embodiments may have the pitching housing 10, the yawing housing 20, the rolling housing 30, and a base 40 arranged in order of mention from the front portion thereof. For example, the yawing housing 20 may house the pitching housing 10, the rolling housing 30 may house the yawing housing 20, and the base 40 may house the rolling housing 30.

According to various embodiments, the first and second axes A1, A2 may cross at a right angle to each other, the second and third axes A2, A3 may cross at a right angle to each other, and the first and third axes A1, A3 may not cross at a right angle to each other. The first and third axes A1, A3 may be perpendicular to each other, but may be spaced apart from each other.

According to the axis arrangements described above, even when the pitching housing 10 rotates, the second axis A2 and the third axis A3 may be arranged not to face in the same direction. In addition, even when the yawing housing 20 rotates, the second axis A2 and the third axis A3 may be arranged not to face in the same direction.

FIG. 1 is a view showing a state in which the pitching housing 10 faces forward (Z-axis). This state of the pitching housing 10 may be defined as a first position. Reference numeral 40 indicates the base.

The gimbal according to various embodiments may provide three-axis rotation and adjustment of the pitching housing 10. The pitching housing 10 may perform a pitching operation around the first axis A1, perform a rolling operation around the second axis A2, and perform a yawing operation around the third axis A3. The second axis A2 may be an optical axis of a lens unit mounted in the pitching housing 20.

The first axis A1 may be perpendicular to the second axis A2, the second axis A2 may be perpendicular to the third axis A3, and the third axis A3 may be perpendicular to the first and second axes A1, A2. In addition, the first axis A1 may cross at a right angle to the second axis A2, the second axis A2 may cross at a right angle to the third axis A3, and the third axis A3 may cross at a right angle to the second axis A2 and may not cross at a right angle to the first axis A1.

Figure 2:
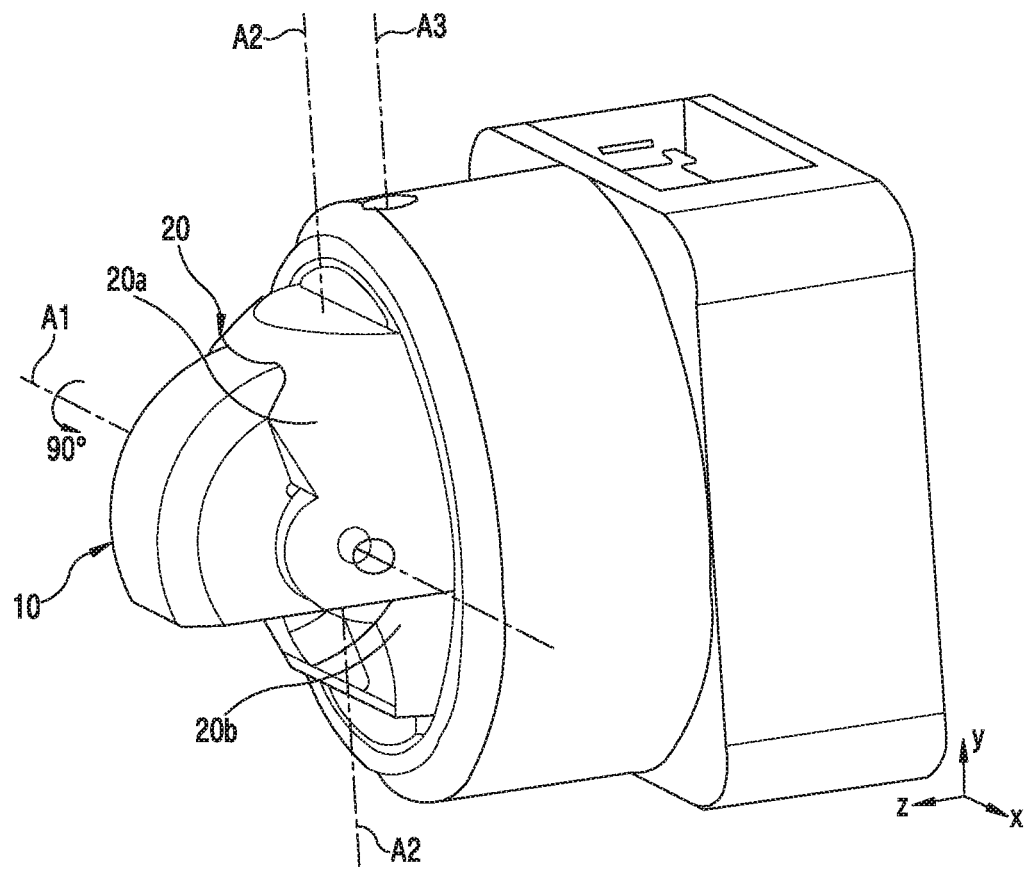
FIG. 2 is a perspective view showing a state in which a pitching housing of the three-axis camera gimbal rotates downwards by 90 degrees according to various embodiments of the present disclosure.

FIG. 2 is a perspective view showing a state in which the pitching housing of the three-axis camera gimbal rotates downwards by 90 degrees according to various embodiments of the present disclosure.

Referring to FIG. 2, the pitching housing 10 according to various embodiments may rotate downwards (Y-axis) from the first position by 90 degrees. This state of the pitching housing 10 may be defined as a second position. In the second position, the pitching housing 10 may photograph a lower side. In the second position, the second axis A2 may be parallel to the third axis A3. In addition, when the lens unit 110 (see FIG. 4) photographs a lower side in the second position, the lens unit may be configured not to be influenced by the shape of the yawing housing 20. The yawing housing 20 may be formed to have a lower portion 20b which is further cut than an upper portion 20a, and may be configured not to interfere with photographing by a lens. That is, the yawing housing 20 may be formed to have the upper and lower portions 20a, 20b which are asymmetrical to each other in the vertical direction and are symmetrical to each other in the horizontal direction.

The gimbal according to various embodiments can allow the lens to photograph a lower side in the second position because the second and third axes A2, A3 are spaced apart from each other and the lower portion 20b of the yawing housing 20 is further cut than the upper portion 20a. The state of the lens unit as shown in FIG. 2 may be defined as a lower side horizontal direction photographing state.

Figure 3:
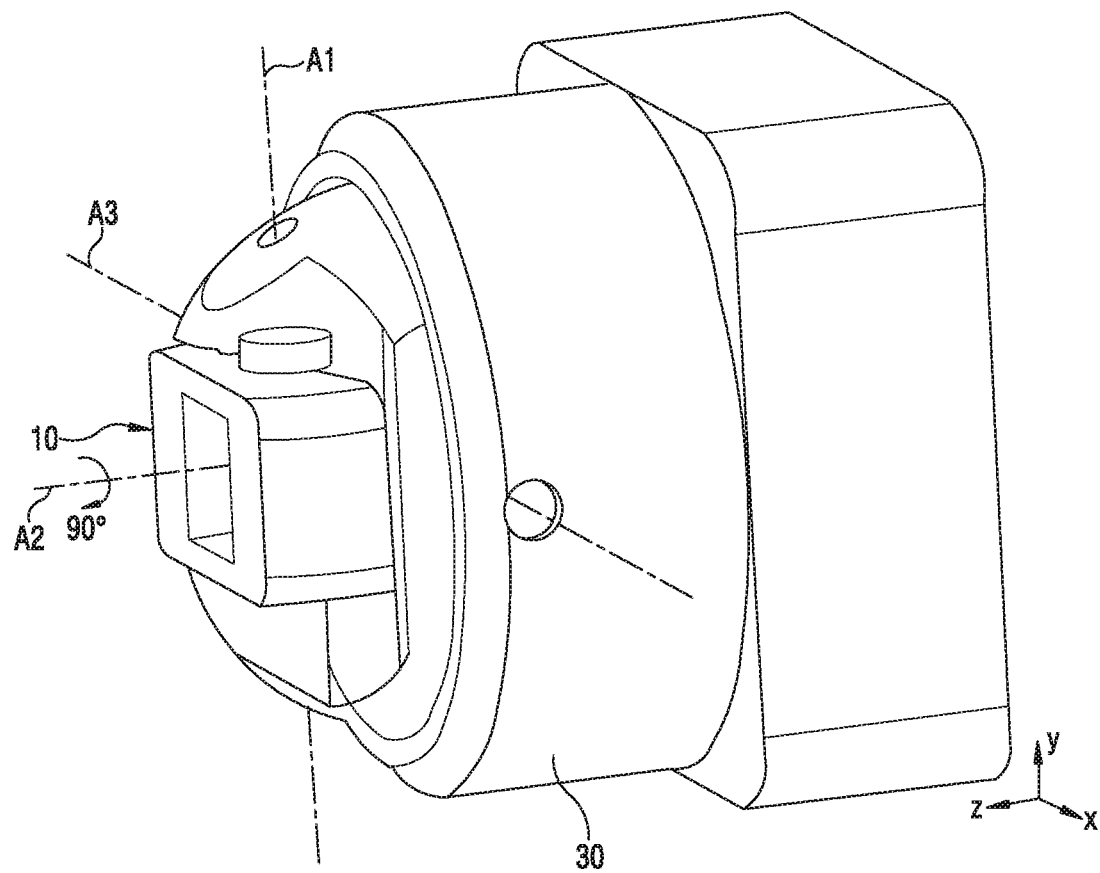
FIG. 3 is a perspective view showing a state in which a rolling housing of the three-axis camera gimbal rotates rightwards by 90 degrees according to various embodiments of the present disclosure.

FIG. 3 is a perspective view showing a state in which the rolling housing of the three-axis camera gimbal rotates rightwards by 90 degrees according to various embodiments of the present disclosure.

Referring to FIG. 3, the rolling housing 30 according to various embodiments may rotate around the second axis A2 rightwards (X-axis) from the first position by 90 degrees. This state of the pitching housing 10 may be defined as a third position. In the third position, the pitching housing 10 may photograph a front side and photograph an image in the vertical state. For example, when the lens photographs a front side in the third position, the lens may photograph an image in the vertical state. The state of the lens unit as shown in FIG. 3 may be defined as a front vertical direction photographing state.

Figure 4:
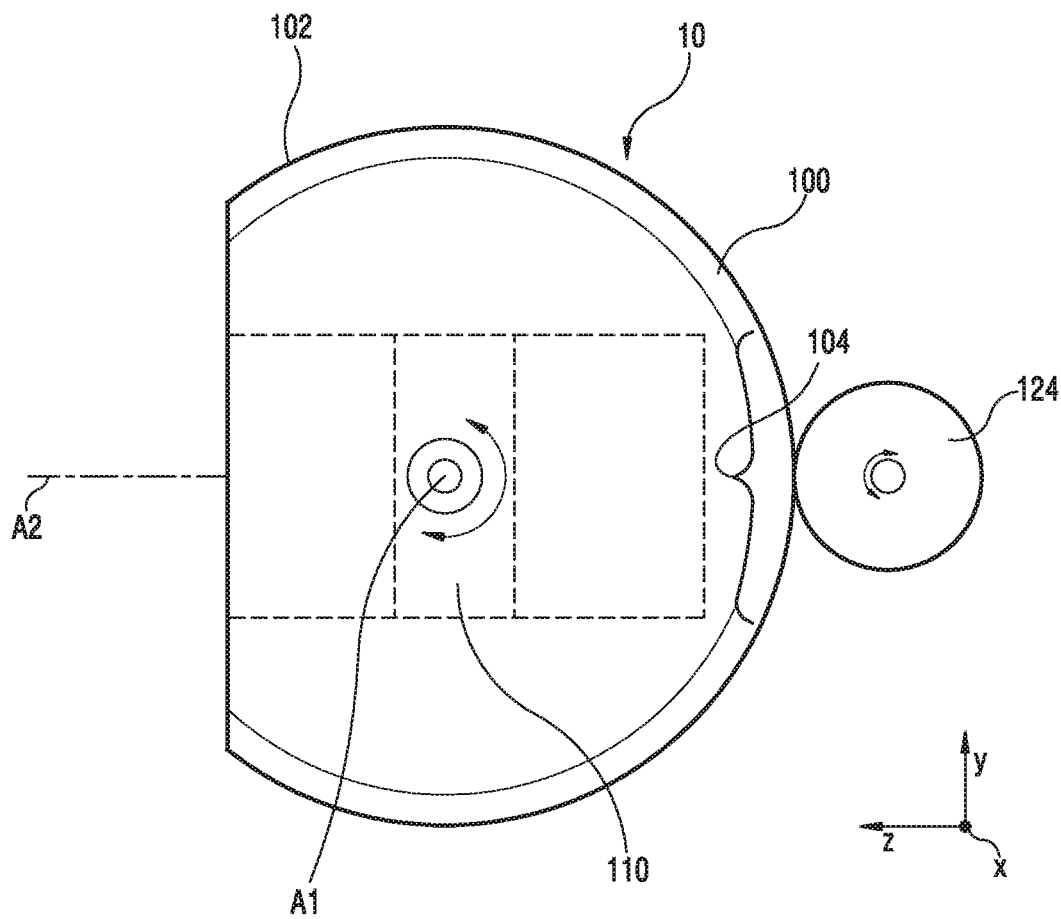
FIG. 4 is a side view showing the pitching housing engaged with a gear according to various embodiments of the present disclosure.

FIG. 4 is a side view showing the pitching housing which is engaged with a gear according to various embodiments of the present disclosure.

Referring to FIG. 4, in the first position, an exterior of the pitching housing 10 according to various embodiments may substantially include a portion 100 which is housed in the yawing housing, a portion 102 which is not housed in the yawing housing, and a portion 104 which is formed on an outer circumference surface of the housed portion 100 to be engaged with a gear 124 of the pitching driving unit (not shown). When the gear 124 rotates, the pitching housing 10 may rotate around the first axis A1.

The housed portion 100 of the pitching housing 10 according to various embodiments may be formed in a substantially hemispheric shape, and may have a curved surface having a curvature. Reference numeral 110 indicates the lens unit. The lens unit 110 according to various embodiments may include a plurality of lenses arranged along the second axis (optical axis). The lens unit 110 may include an image pick-up device (not shown), for example, an image sensor.

Figure 5A:
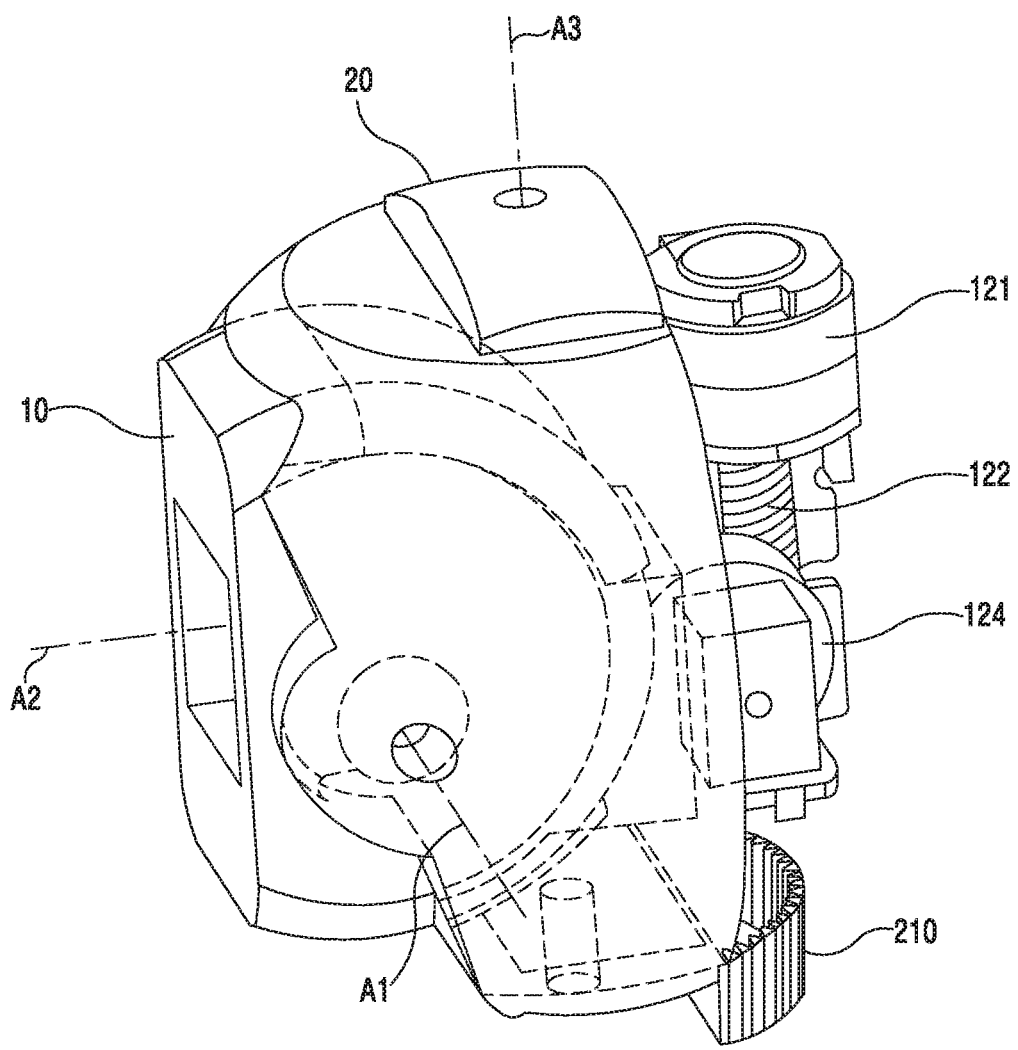
FIGS. 5A and 5B are perspective views showing a pitching driving unit according to various embodiments of the present disclosure.
Figure 5B:
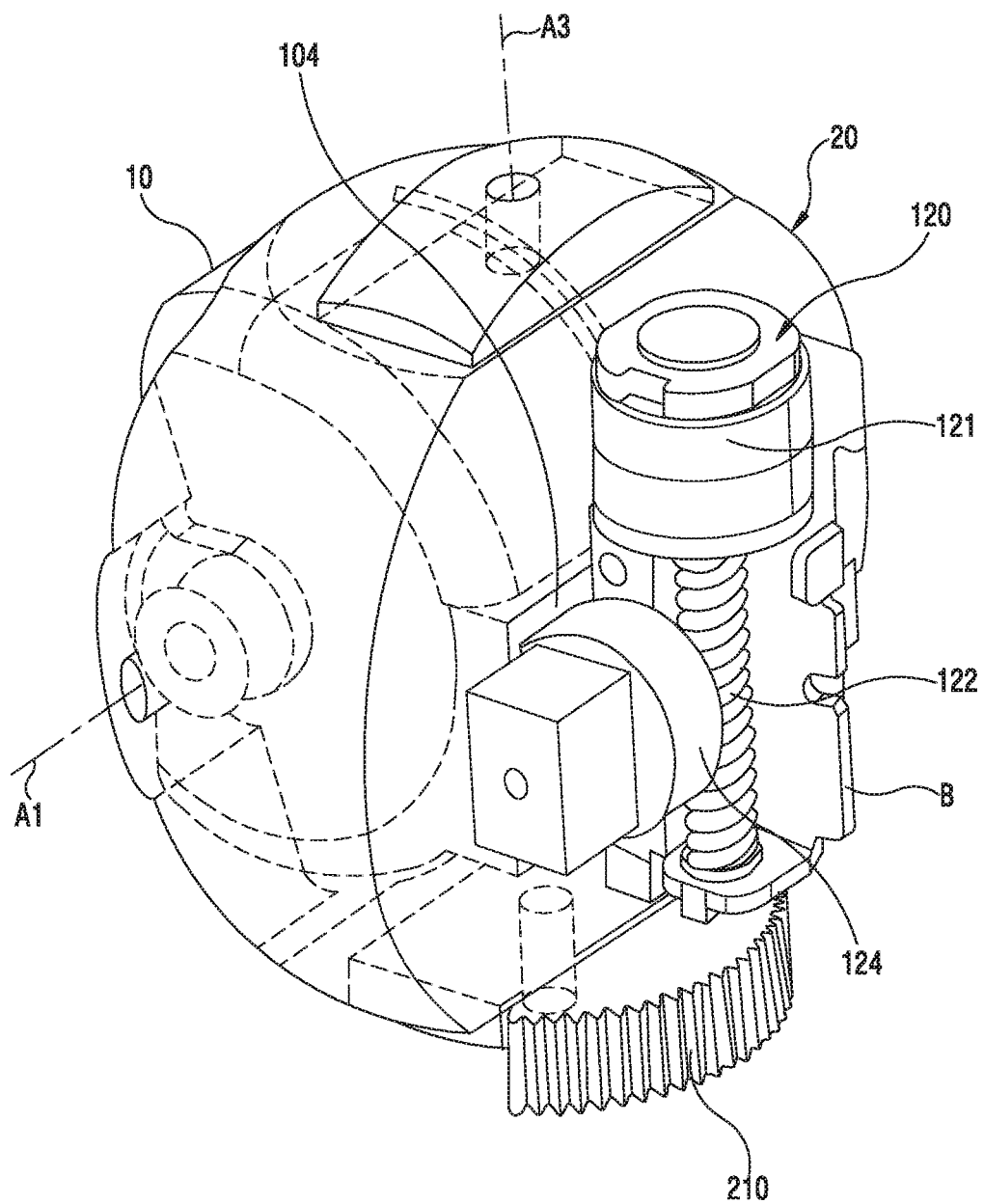

FIGS. 5A and 5B are perspective views showing the pitching driving unit according to various embodiments of the present disclosure.

Referring to FIGS. 5A and 5B, the gimbal according to various embodiments may have the pitching driving unit 120 disposed on a rear portion of the yawing housing 20 to be interlocked with the pitching housing 10. The pitching driving unit 120 may provide a driving force for rotating the lens unit (see FIG. 4) around the second axis A2.

The pitching driving unit 120 according to various embodiments may be mounted on the rear portion of the yawing housing in an upright position. The pitching driving unit 120 according to various embodiments may include a driving motor 121 and a gear array. The driving motor 121 may be a driving device capable of precisely controlling, such as a stepping motor. The gear array may include a first gear 122 coaxially disposed with the axis of the driving motor 121, and a second gear (not shown) disposed perpendicular to the first gear 122 to be engaged therewith. The first and second gears may be defined as well-known worm gears. The second gear may be coaxially disposed with another second gear 124, and another second gear 124 may be disposed to be engaged with the engaged portion 104 (see FIG. 4) of the pitching housing. When the driving motor 121 is driven, a rotational driving force may be transmitted to a third gear 124 via the first and second gears 122 and may cause the lens unit to perform the pitching operation around the first axis A1. The driving motor 121 may control an amount of rotation under control of a controller (not shown). Reference numeral 210 indicates a gear portion formed in the yawing housing. Reference sign B indicates a mounting bracket.

Figure 6:
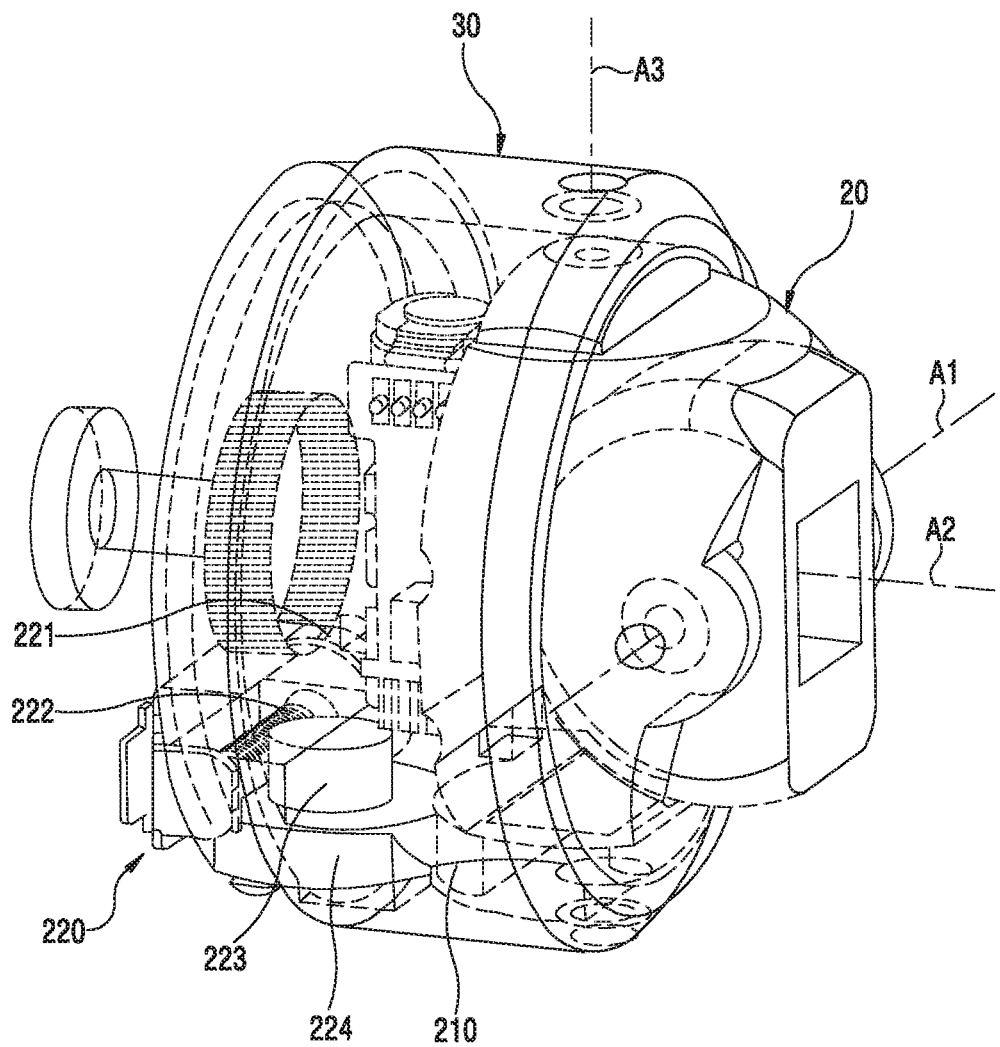
FIG. 6 is a perspective view showing a yawing driving unit according to various embodiments of the present disclosure.

FIG. 6 is a perspective view showing the yawing driving unit according to various embodiments of the present disclosure.

Referring to FIG. 6, the gimbal according to various embodiments may have the yawing driving unit disposed under the rear portion of the yawing housing 20. The yawing driving unit 220 according to various embodiments may be disposed to be interlocked with the yawing housing 20. The yawing driving unit 220 may provide a driving force for rotating the lens unit (FIG. 4) around the third axis A3.

The yawing driving unit 220 according to various embodiments may be mounted in the rolling housing 30 under the rear portion of the yawing housing 20. The yawing driving unit 220 according to various embodiments may include a driving motor 221 and a gear array. The driving motor 221 may be a driving device capable of precisely controlling such as a stepping motor. The gear array may include a first gear 222 coaxially disposed with the axis of the driving motor 221 and a second gear 223 disposed perpendicular to the first gear 222 to be engaged with the first gear 222. The first and second gears 222, 223 may be defined as well-known worm gears. The second gear 223 may be coaxially disposed with another second gear 224, and another second gear 224 may be disposed to be engaged with the engaged portion 210 of the yawing housing 20. The engaged portion 210 may have gear teeth.

When the driving motor 221 according to various embodiments is driven, a rotational driving force may be transmitted to the third gear 210 via the first and second gears 222, 223, 224 and may cause the lens unit to perform a yawing operation around the third axis A3. The driving motor 221 may control an amount of rotation under the control of a controller (not shown).

Figure 7:
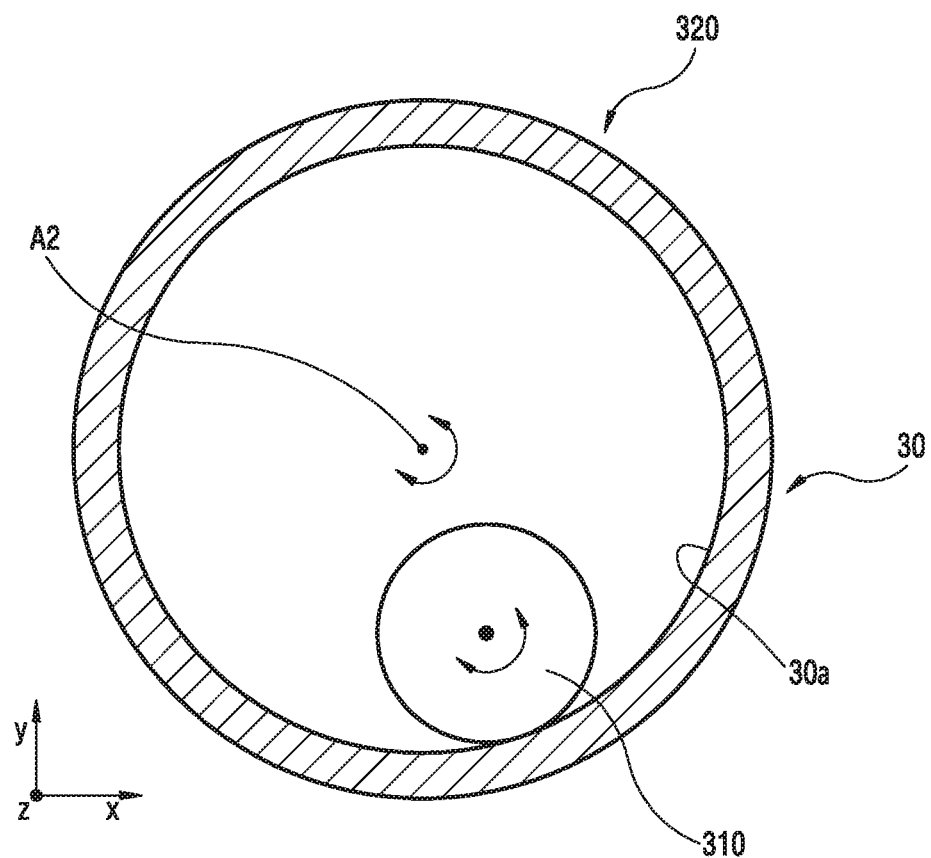
FIG. 7 is a perspective view schematically showing a rolling driving unit according to various embodiments of the present disclosure.

FIG. 7 is a perspective view schematically showing the rolling driving unit according to various embodiments of the present disclosure.

Referring to FIG. 7, the rolling driving unit 320 according to various embodiments may be disposed to be interlocked with the rolling housing 30, and may be mounted on the base. The rolling driving unit according to various embodiments may include a driving motor (not shown) and a first gear 310 connected with the driving motor.

The rolling housing 30 according to various embodiments may include an interlocking portion to receive a driving force of the rolling driving unit. The interlocking portion may be formed on an inner surface of the rolling housing. The interlocking portion according to various embodiments may be provided with a plurality of gear teeth, and may be disposed to be engaged with the first gear 310. Various embodiments of the gear arrangement to transmit the driving force to the rolling housing 30 are possible. The rolling housing 30 may receive the driving force and may rotate around the second axis A2.

Hereinafter, a configuration of a three-axis adjustment camera lens gimbal (hereinafter, referred to as a gimbal) mounted on an electronic device according to various embodiments will be described with reference to the accompanying drawings.

Figure 8:
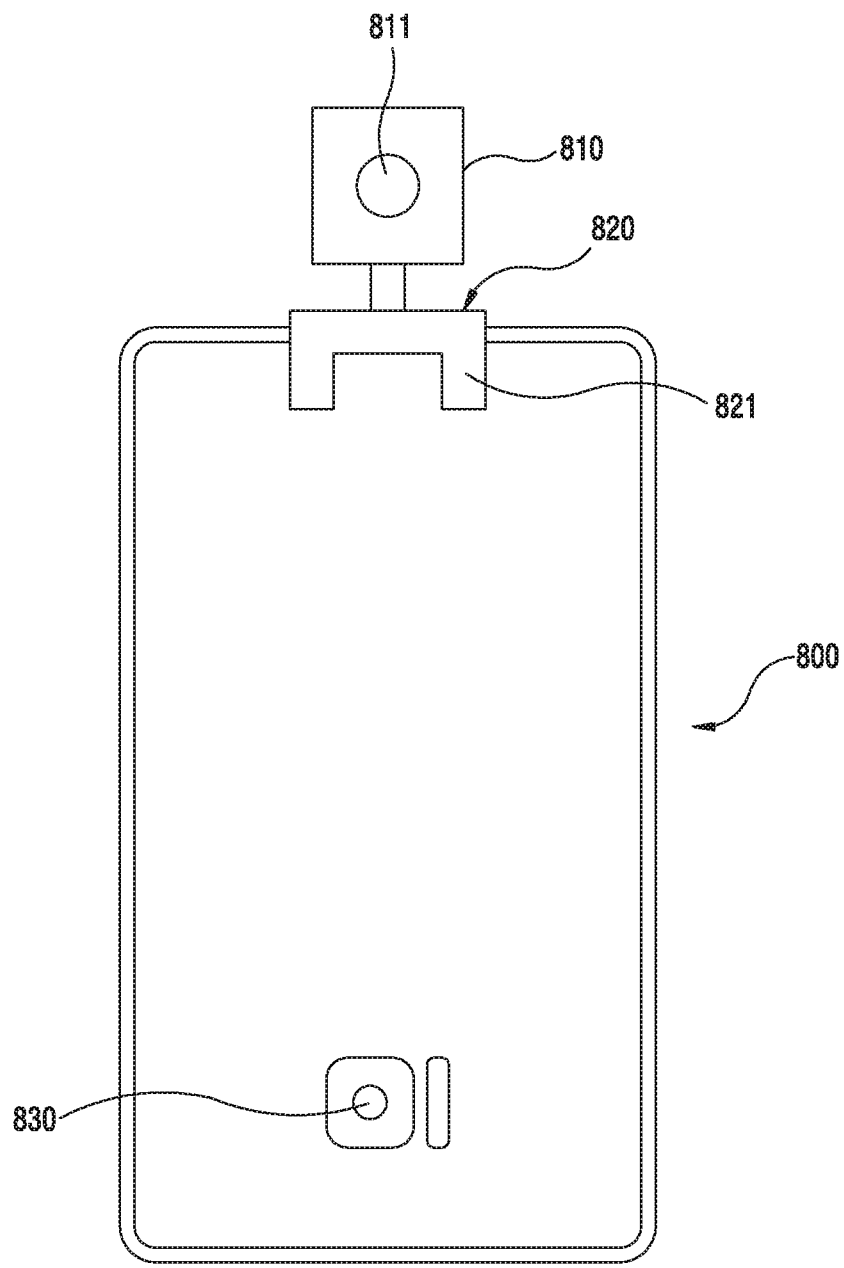
FIG. 8 is a front view showing a camera gimbal which is mounted on a connector of an electronic device according to various embodiments of the present disclosure.

Referring to FIG. 8, a gimbal 810 according to various embodiments may be mountable on or dismountable from an electronic device 800 such as a smart phone, and may be mounted on a connector (not shown) disposed on an exterior of the electronic device 800 to be used in a photographing mode of a camera lens 811. For example, the gimbal 800 according to various embodiments may be mounted on a USB connector or an ear phone connector disposed on the exterior of the electronic device 800. In general, the USB connector may be disposed on a lower end of the electronic device 800, and the gimbal 800 according to various embodiments may be mounted and used in the USB connector. For example, when the electronic device 800 is mounted on an unmanned air vehicle such as a drone, an upper end of the electronic device 800 may be fixed to the unmanned air vehicle, and the gimbal 811 may be mounted on a lower end of the electronic device 800, such that the camera lens 811 mounted in the gimbal 811 can be used. The gimbal 811 according to various embodiments may be mounted on the electronic device 800 by using a connecting device, called a holder 820. The gimbal 810 according to various embodiments may be electrically connected with the electronic device 800 via a connector (not shown) provided in the gimbal and the holder 820, and may be mechanically fixed. For example, the holder 820 may include a plurality of supports 821 to be mounted on or dismounted from the electronic device 800. Reference numeral 830 may indicate a rear facing camera lens disposed on the rear surface of the electronic device 800. The electronic device 800 according to various embodiments may photograph in 3D by using the camera lens 811 and the rear facing camera lens 830.

Figure 9:
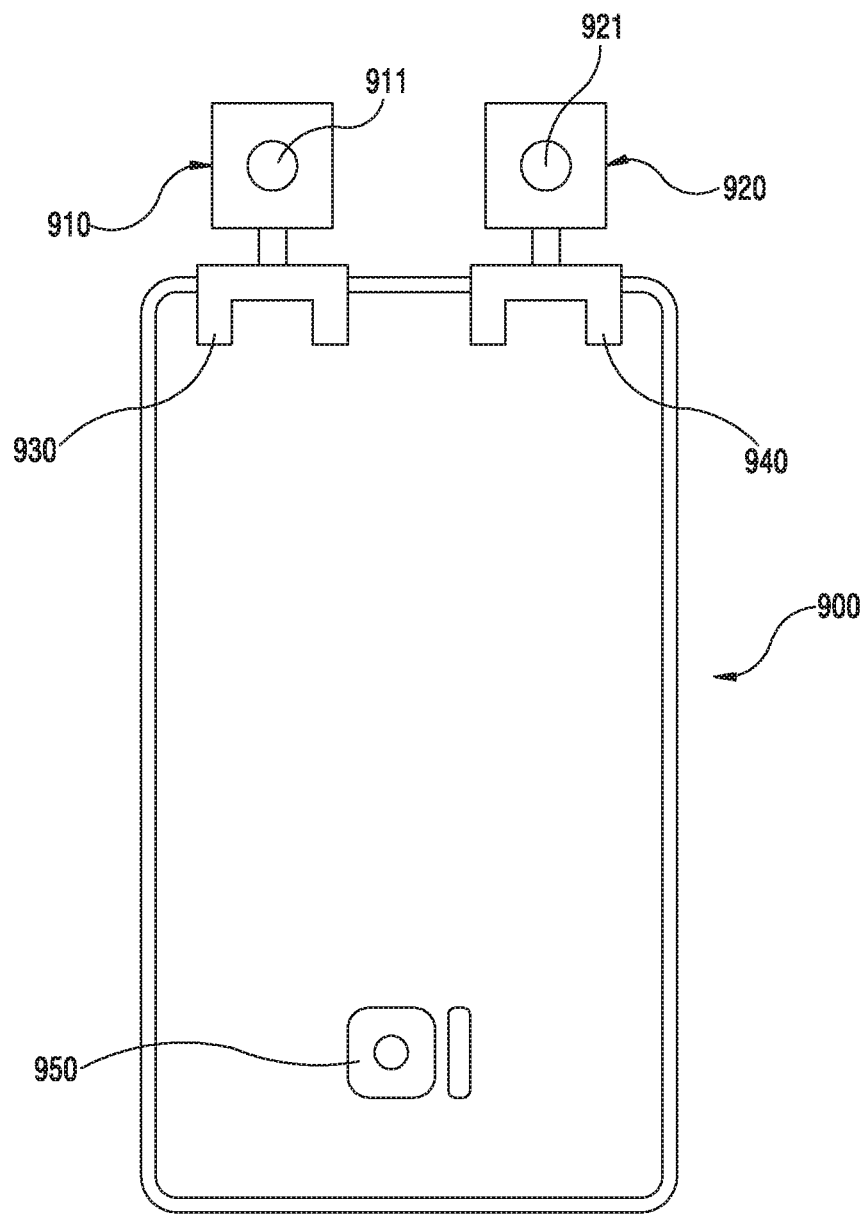
FIG. 9 is a front view showing first and second camera gimbals which are mounted on an electronic device according to various embodiments of the present disclosure.

Referring to FIG. 9, a plurality of gimbals 910, 920 according to various embodiments may be mounted on an electronic device 900, and may have a plurality of camera lenses 911, 921 mounted therein. Each gimbal 910, 920 may have the same configuration as that of the gimbal 800 shown in FIG. 8 and thus a detailed description thereof is omitted.

According to various embodiments, the first and second gimbals 910, 920 may be mounted on first and second connectors, respectively, disposed on an exterior of the electronic device 900. The first and second gimbals 910, 920 according to various embodiments may include single lenses 911, 921, respectively. For example, the first and second gimbals 910, 920 may be mounted on the electronic device 900 by means of first and second holders 930, 940, respectively, and may be used. The electronic device 900 according to various embodiments may photograph in 3D by using first and second camera lenses 911, 921. Reference numeral 950 may indicate a rear facing camera lens disposed on the rear surface of the electronic device 900.

Figure 10:
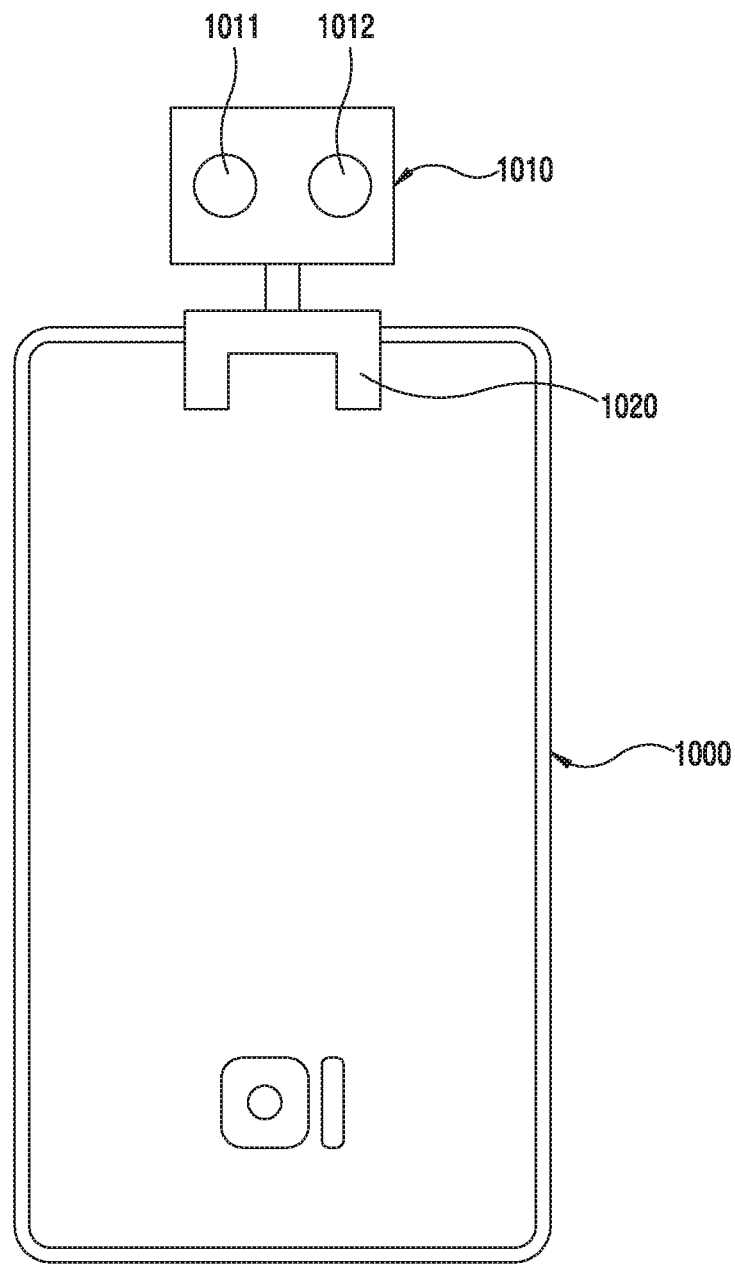
FIG. 10 is a front view showing a gimbal which is mounted on an electronic device according to various embodiments of the present disclosure.

Referring to FIG. 10, a gimbal 1010 according to various embodiments may be configured in a multi lens type. For example, the gimbal 1010 may include two camera lenses, first and second camera lenses 1011, 1012, arranged in parallel with each other. An electronic device 1000 according to various embodiments may photograph in 3D by using the first and second camera lenses 1011, 1012. The gimbal 1010 according to various embodiments may be mounted on or dismounted from the electronic device 1000 by means of a holder 1020. The electronic device 1000 according to various embodiments may photograph in 3D by using the first and second camera lenses 1011, 1021. Reference numeral 950 may indicate a rear facing camera lens disposed on the rear surface of the electronic device 900.

Figure 11:
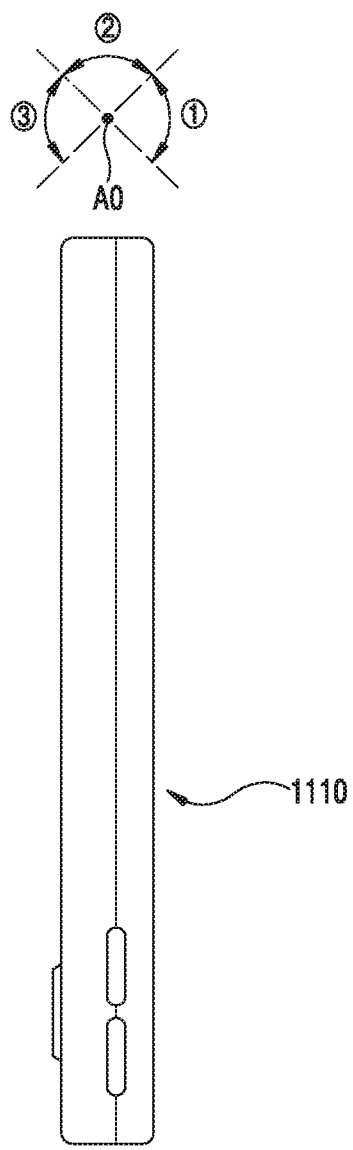
FIG. 11 is a view showing an example of a region that can be photographed by the rotating gimbal of FIG. 8 according to various embodiments of the present disclosure.

Referring to FIG. 11, a gimbal mounted on an electronic device 1100 according to various embodiments may rotate around a first axis A1 to photograph in various directions. The gimbal according to various embodiments may have the same configuration as those of the gimbals shown in FIGS. 8 to 10, and thus is not illustrated in FIG. 11.

A photographing direction of the gimbal mounted on the electronic device 1000 according to various embodiments may be divided into three directions. For example, the gimbal may rotate around the first axis A0 to provide a front view (①), a top view (②), and a rear view (③). The first axis A0 according to various embodiments may be a pitching axis of the gimbal.

Figure 12A:
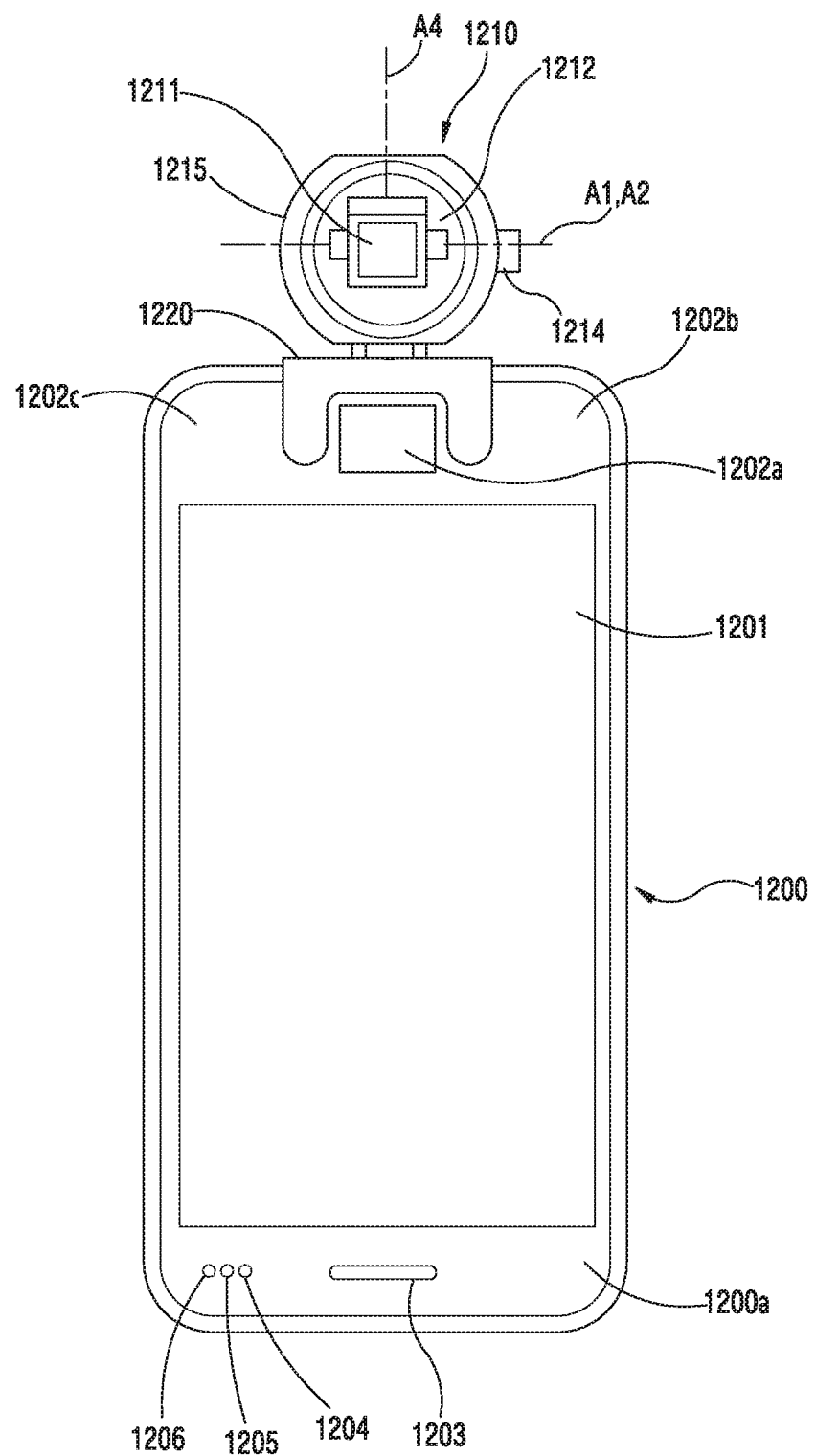
FIG. 12A is a front view showing a gimbal which is mounted on an electronic device according to various embodiments of the present disclosure.
Figure 12B:
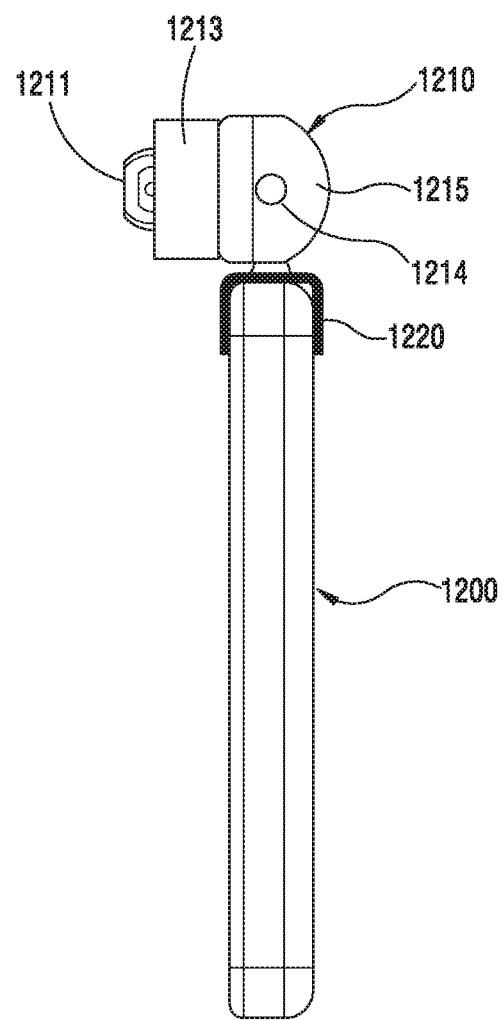
FIG. 12B is one side view showing the gimbal mounted on the electronic device according to various embodiments of the present disclosure.
Figure 12C:
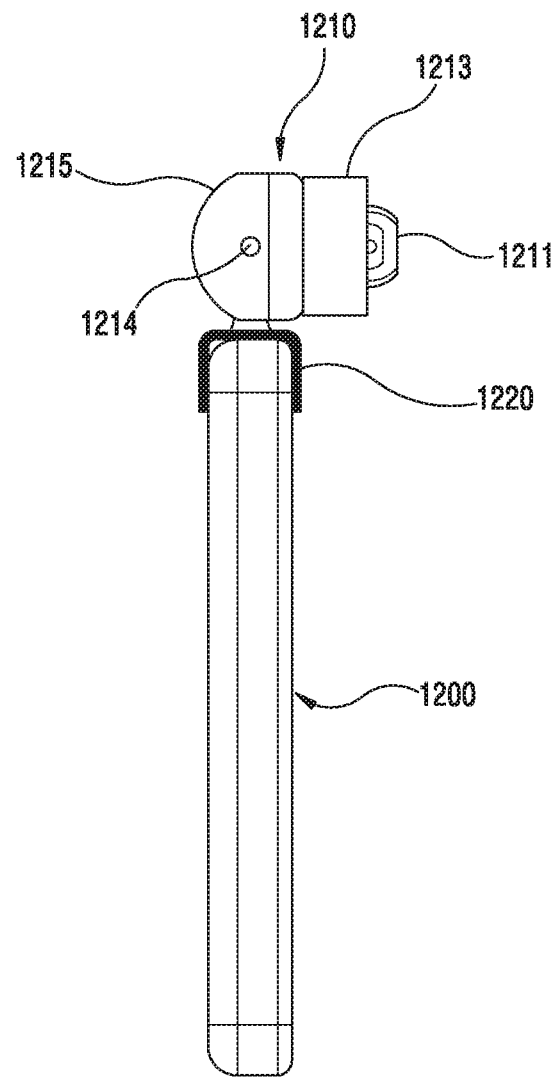
FIG. 12C is the other side view showing the gimbal mounted on the electronic device according to various embodiments of the present disclosure.

A configuration of a gimbal mounted on an electronic device according to various embodiments will be described with reference to FIGS. 12A to 12C.

An electronic device 1200 according to various embodiments may have a display 1201 (or referred to as a touch screen since it has a touch panel mounted therein) disposed on an upper surface 1200a thereof. A receiver 1203 may be disposed on an upper side of the display 1201 to receive a voice of the other person. A microphone (not shown) may be disposed on a lower side of the display 1201 to transmit a voice of a user of the electronic device to the other person.

Components for performing various functions of the electronic device 1200 may be arranged on the periphery of the receiver 1203. The components may include at least one sensor module 1204, 1205. The sensor module 1204, 1205 may include at least one of, for example, an illuminance sensor (for example, a light sensor), a proximity sensor (for example, a light sensor), an infrared sensor, and an ultrasonic sensor. According to an embodiment, the components may include a front facing camera 1206.

The display 1201 may be formed to be large enough to occupy most of the front surface of the electronic device 1200. A main home screen may be the first screen that is displayed on the display 1201 when power of the electronic device 1200 is turned on. In addition, when the electronic device 1200 has different home screens of numerous pages, the main home screen may be the first one of the home screens of the numerous pages. The home screen may display shortcut icons for executing frequently used applications, a main menu toggle key, time, weather, or the like. The main menu toggle key displays a menu screen on the display 1201. In addition, a state bar indicating the state of the electronic device 1200, such as a battery charging state, an intensity of a received signal, a current time, may be formed on the upper end of the display 1201. A home key 1202a, a menu key 1202b, and a back key 1202c may be formed on the lower portion of the display 101.

The home key 1202a may display the main home screen on the display 1201. For example, when the home key 1202a is touched in a state in which a home screen different from the main home screen or the menu screen is displayed on the display 1201, the main home screen may be displayed on the display 1201. In addition, when the home key 1202a is touched while applications are being executed on the display 1201, the main home screen may be displayed on the display 1201. In addition, the home key 1202a may be used to display recently used applications on the display 1201 or to display a task manager.

The menu key 1202b provides a link menu that can be used on the display 1201. The link menu may include a widget add menu, a background screen change menu, a search menu, an edit menu, an environment setting menu, or the like. The back key 1202c may display a screen that was executed right before a currently executed screen or may terminate the most recently used application.

The electronic device 100 according to various embodiments may have a gimbal 1210 mounted on a USB connector (not shown) disposed on the lower end thereof. For example, the gimbal 1210 may be mounted on the electronic device 1200 so as to be rotatable around a second axis A2. The second axis may be a yawing axis of a camera module.

The gimbal 1200 according to various embodiments may include a pitching housing 1211, a rolling housing 1212, a yawing housing 1213, driving units (not shown) for driving the respective housings, and an adjustment shaft 1214. The respective housings and the driving units will be described in detail below.

The pitching housing 1211 according to various embodiments may house a camera module and thus may be referred to as a camera housing. The pitching housing 1211 may be disposed to allow the camera module to rotate around the second axis A2.

At least a portion of the pitching housing according to various embodiments may be housed in the rolling housing, and at least a portion of the rolling housing may be housed in the yawing housing, and at least a portion of the yawing housing may be housed in a main housing.

The gimbal according to various embodiments may rotate around the adjustment shaft to provide a front view, a top view, and a rear view. The adjustment shaft according to various embodiments may be manually adjusted.

Figure 13A:
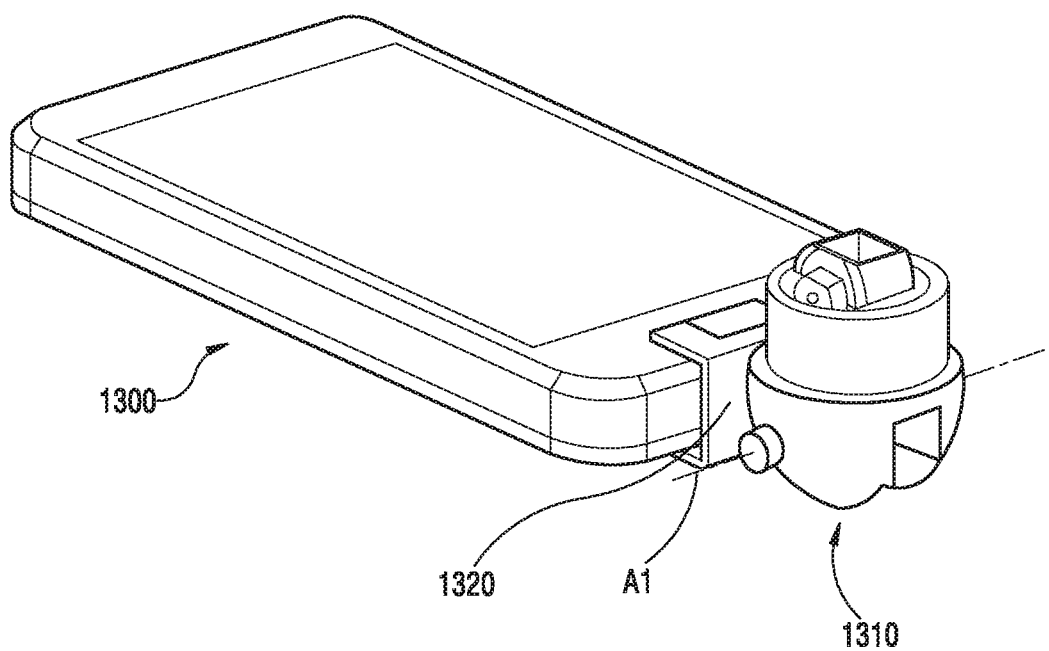
FIG. 13A is a perspective view showing a front view state of a gimbal which is mounted on an electronic device according to various embodiments of the present disclosure.
Figure 13B:
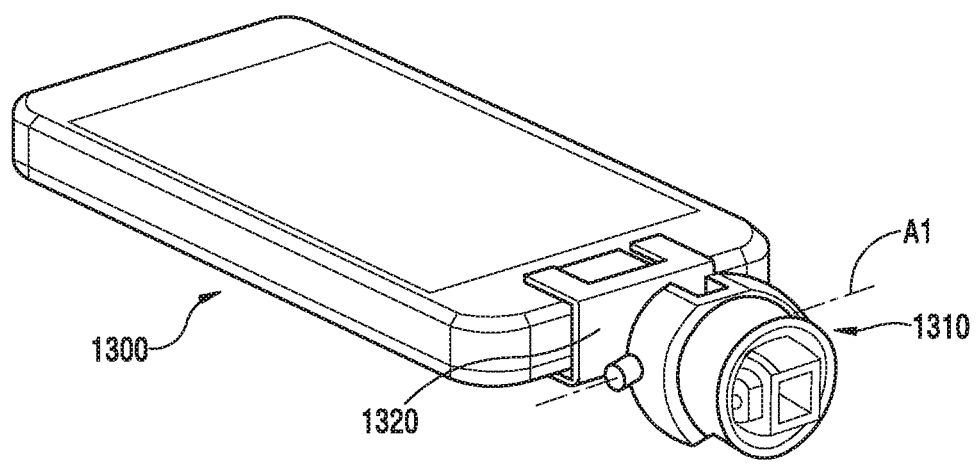
FIG. 13B is a perspective view showing a top view state of the gimbal mounted on the electronic device according to various embodiments of the present disclosure.
Figure 13C:
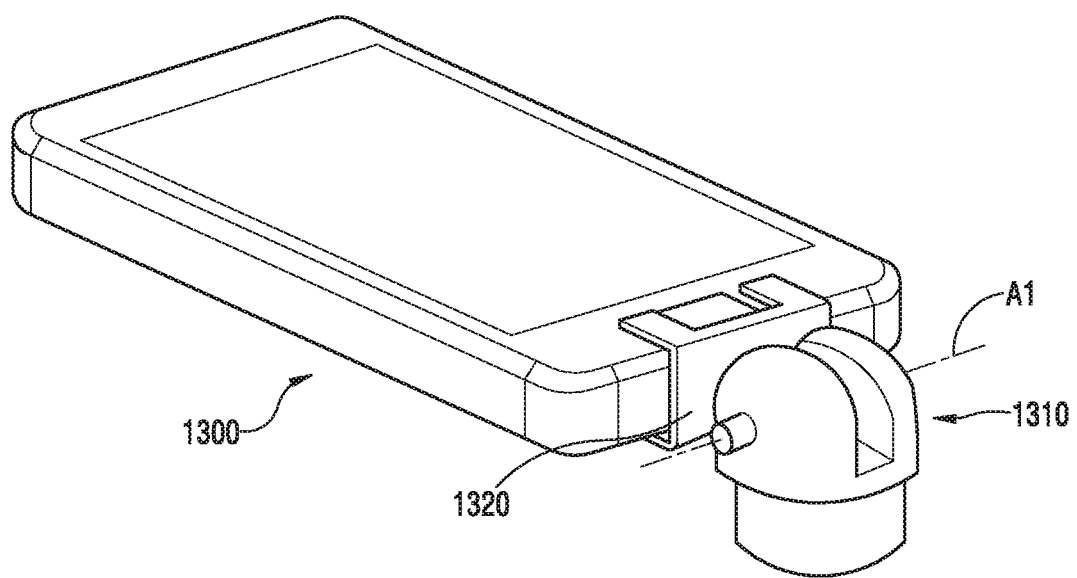
FIG. 13C is a perspective view showing a rear view state of the gimbal mounted on the electronic device according to various embodiments of the present disclosure.

FIG. 13A illustrates a state in which a gimbal 1310 mounted on an electronic device 1300 by means of a holder 1320 according to various embodiments faces a front view. FIG. 13B illustrates a state in which the gimbal 1310 mounted on the electronic device 1300 by means of the holder 1320 faces a top view after rotating around a first axis A1. FIG. 13C illustrates a state in which the gimbal 1310 mounted on the electronic device 1300 by means of the holder 1320 according to various embodiments faces a rear view after rotating around the first axis A1.

A configuration of a gimbal according to various embodiments of the present disclosure will be described with reference to FIGS. 14 to 18. A gimbal 1410 according to various embodiments may be the same as or similar to the gimbals shown in FIGS. 8 to 13.

Figure 14:
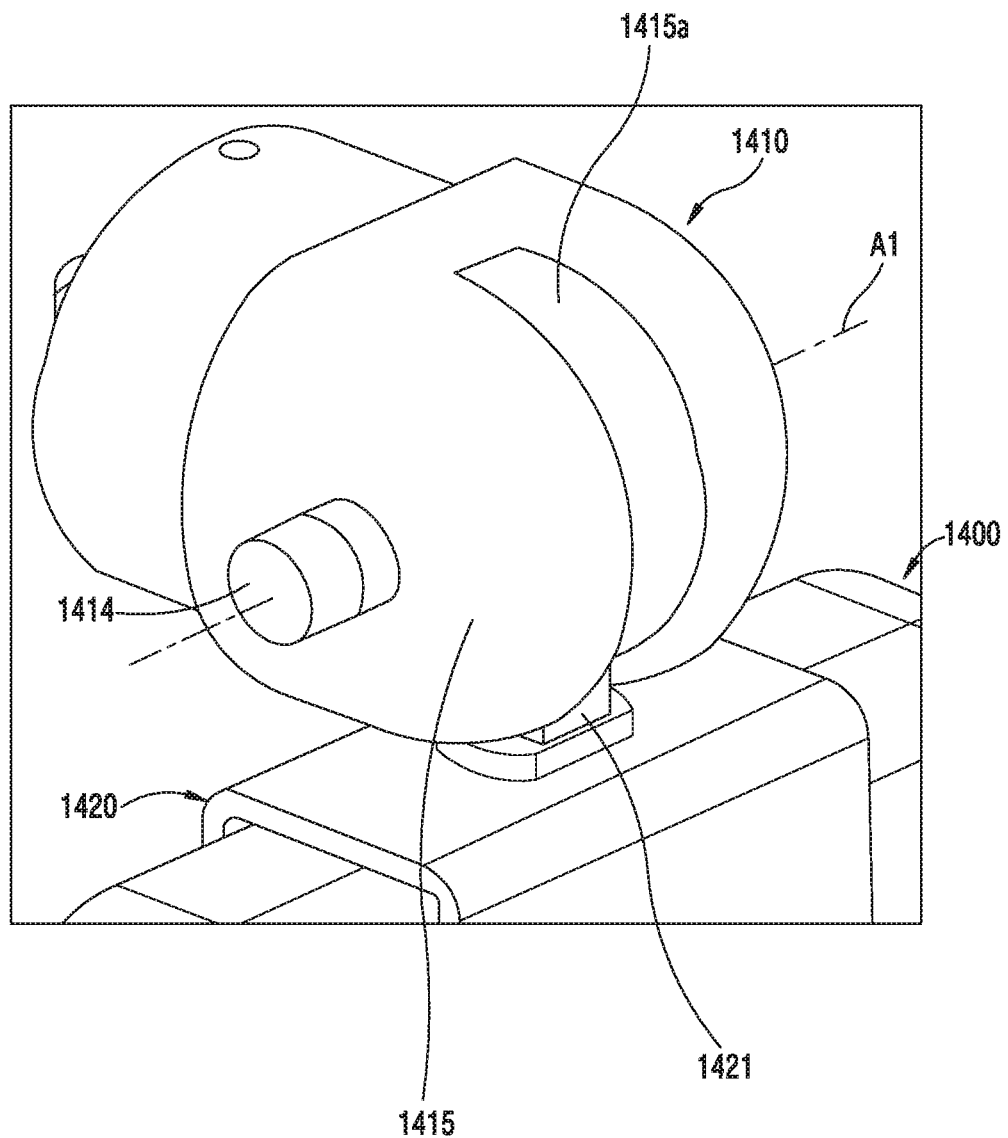
FIG. 14 is a perspective view enlarging a gimbal which is mounted on an electronic device according to various embodiments of the present disclosure.

Referring to FIG. 14, the gimbal 1410 according to various embodiments may be mounted on a connector exposed from the exterior of an electronic device 1400, for example, on a USB connector, by means of a holder 1420. The gimbal 1410 may provide a front view, a top view, or a rear view by rotating an adjustment shaft 1414 around a first axis A1. The adjustment shaft 1414 may have one end and the other end, and may have a protrusion formed at one end thereof to make it easy to adjust. The adjustment shaft 1414 may be disposed along the first axis (A1), and may be rotatably coupled to a connection arm 1421 formed in the holder 1420. A main housing 1415 of the gimbal 1410 according to various embodiments may have a space 1415 opened in a substantially vertical direction in order to house the connection arm 1421 connected therewith.

Figure 15:
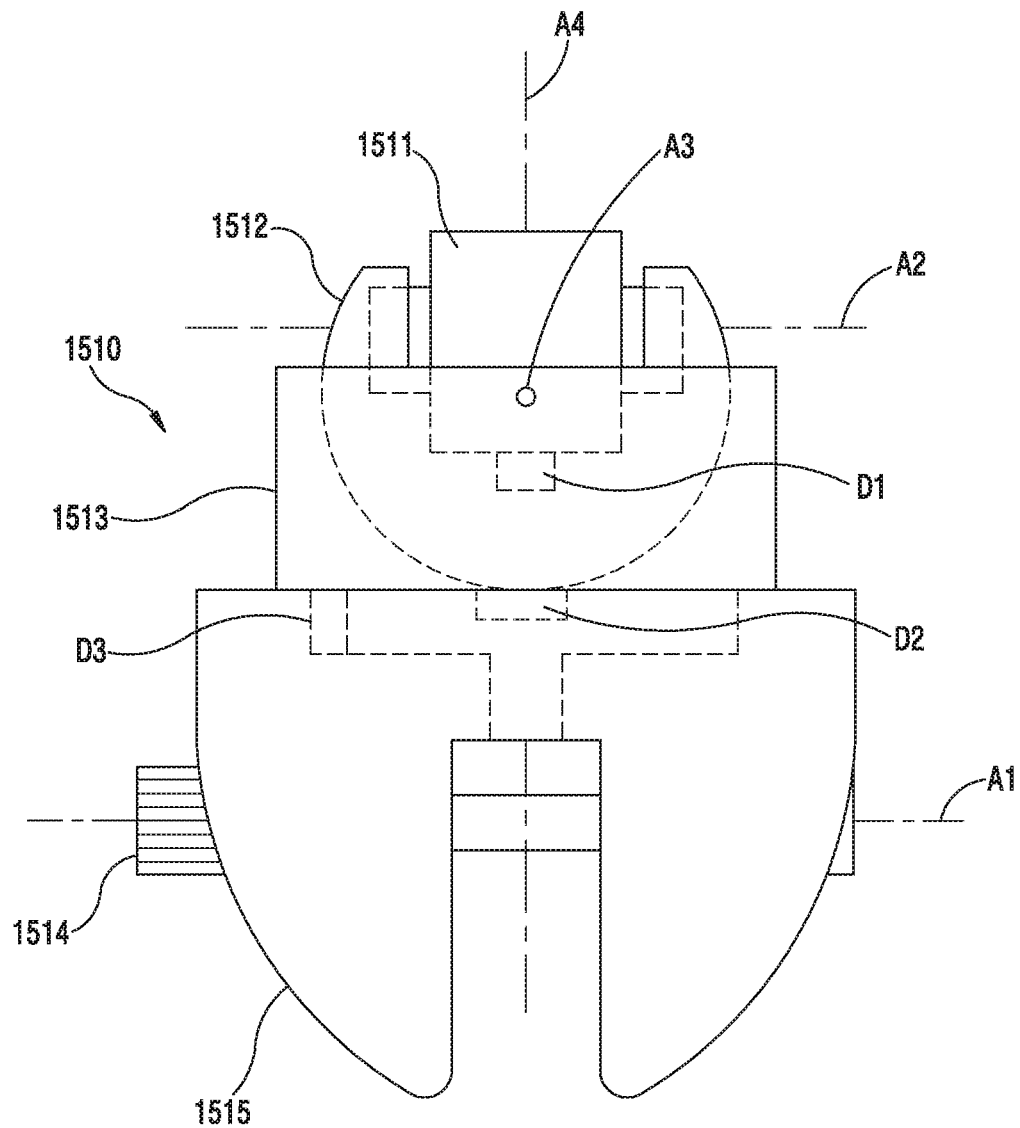
FIG. 15 is a plane view showing a gimbal which is mounted on an electronic device according to various embodiments of the present disclosure.

Referring to FIG. 15, the gimbal according to various embodiments may be an apparatus that is mounted on an unmanned air vehicle such as a drone to maintain horizontality of a camera lens. The gimbal according to various embodiments may be an external apparatus that is mounted on a connector disposed on the exterior of an electronic device. For example, the gimbal according to various embodiments may be configured to have a subminiature size and to be light, and may precisely control to maintain horizontality of a photographing apparatus such as a camera along three axes.

The gimbal according to various embodiments may include a plurality of housings 10, 12, a pitching driving unit 32, a rolling driving unit 30, and a yawing driving unit 34. The driving units mentioned above may be indicated by other terms such as driving devices, driving modules, driving components, etc. The gimbal mentioned above may be indicated by other terms such as a horizontality stabilizing device, a stabilizer, etc.

The plurality of housings 10, 12 according to various embodiments may stably house the driving units 30, 32, 34 to allow them to operate, and may provide rotation axes to allow a camera lens to perform a pitching operation, a rolling operation, and a yawing operation therearound.

The pitching housing according to various embodiments may include a camera module. The pitching housing may be rotated around a second axis by the pitching driving unit. The yawing housing according to various embodiments may house the pitching housing. The yawing housing may be rotated around a third axis by the yawing driving unit. The rolling housing according to various embodiments may include the yawing housing. The rolling housing may be rotated around a fourth axis by the rolling driving unit. The main housing may house the rolling housing.

The pitching housing according to various embodiments may include a first connection structure so as to be rotatable around the second axis in the yawing housing. The yawing housing according to various embodiments may include a second connection structure so as to be rotatable around the third axis in the rolling housing. The rolling housing according to various embodiments may include a second connection structure so as to be rotatable around the fourth axis in the main housing.

Figure 16A:
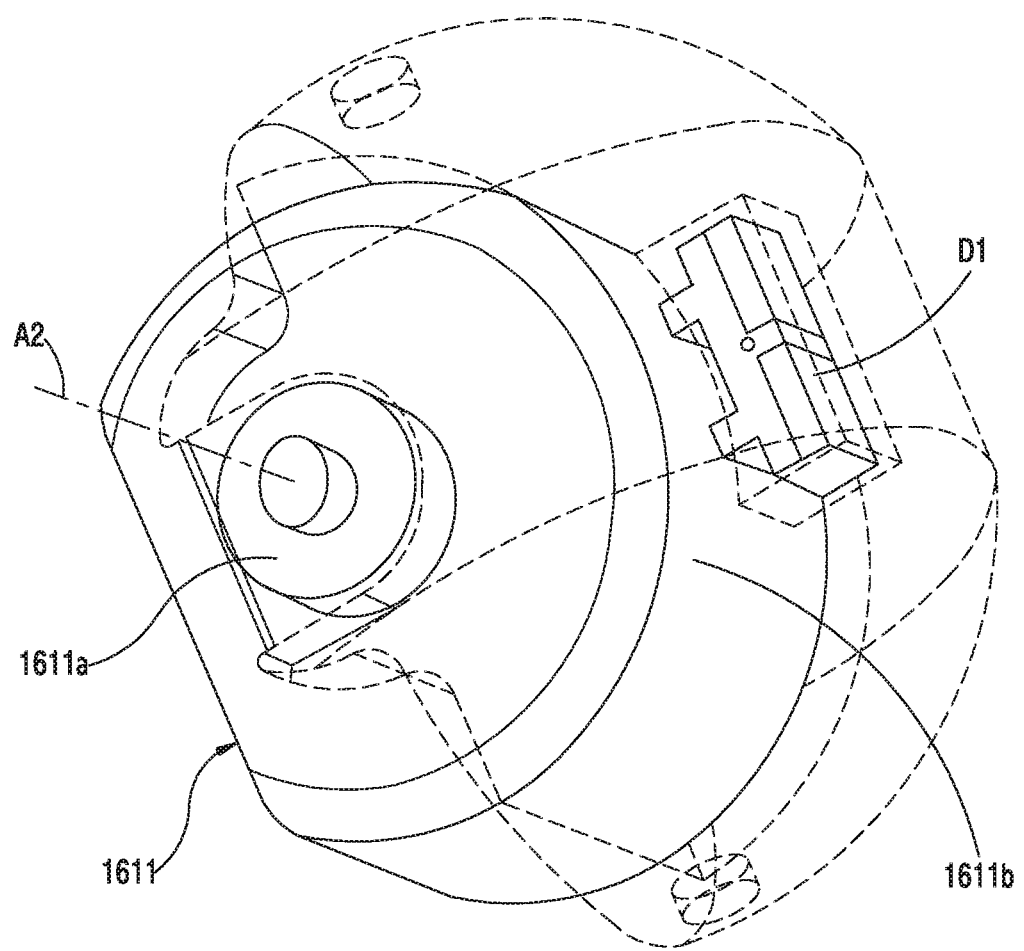
FIG. 16A is a perspective view showing a lens housing and a pitching driving unit which are interlocked with each other according to various embodiments of the present disclosure.
Figure 16B:
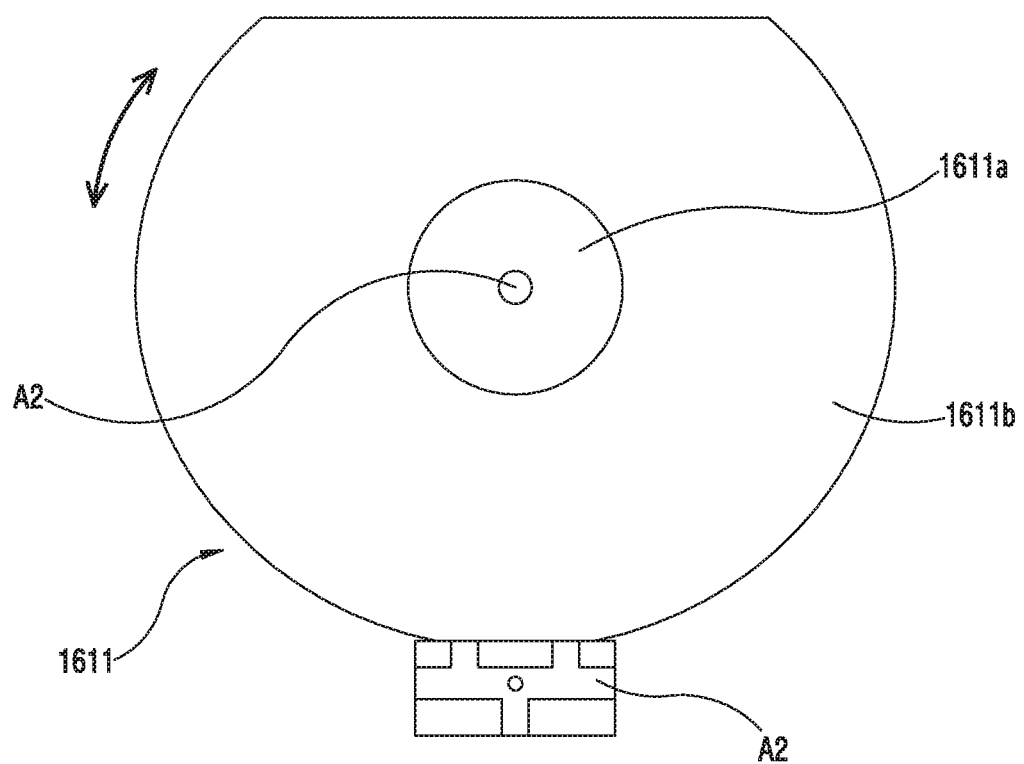
FIG. 16B is a front view showing the lens housing and the pitching driving unit interlocked with each other according to various embodiments of the present disclosure.

Referring to FIGS. 16A and 16B, a pitching housing 1611 according to various embodiments may have a pitching driving unit D1 disposed along an outer circumference surface 1611$b$ thereof. The pitching housing 1611 interlocked with the pitching driving unit D1 may rotate around a second axis A2 according to the operation of the pitching driving unit D1. A first connection structure 1611$a$ may protrude from both side surfaces of the pitching housing 1611 to be rotatably coupled to a yawing housing. The first connection structure may include at least one cylindrical portion.

The pitching driving unit D1 according to various embodiments may include at least one piezoelectric element. For example, the pitching driving unit D1 may include a piezoelectric motor. The piezoelectric motor may be a piezo linear motor. The piezo linear motor may have a superhigh speed and a superprecision position control function.

Figure 17A:
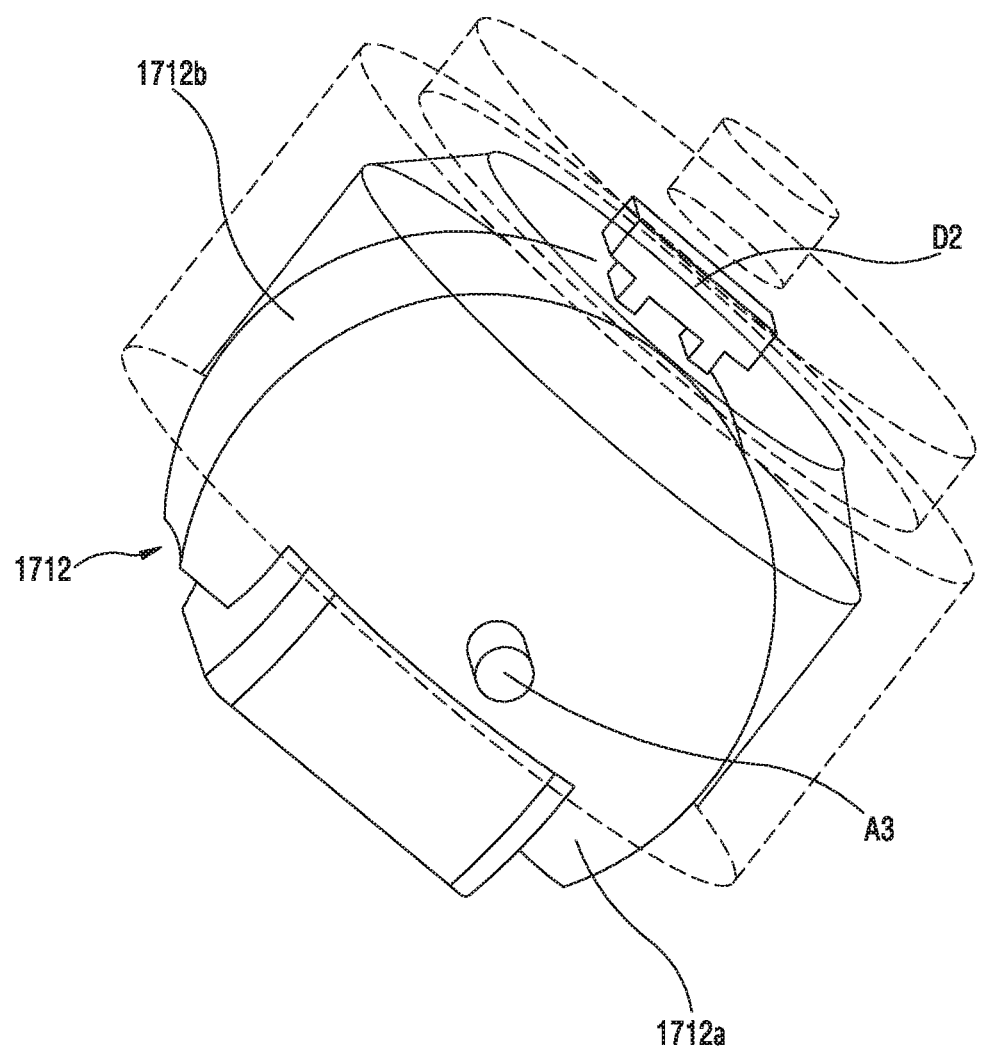
FIG. 17A is a perspective view showing a yawing housing and a yawing driving unit which are interlocked with each other according to various embodiments of the present disclosure.
Figure 17B:
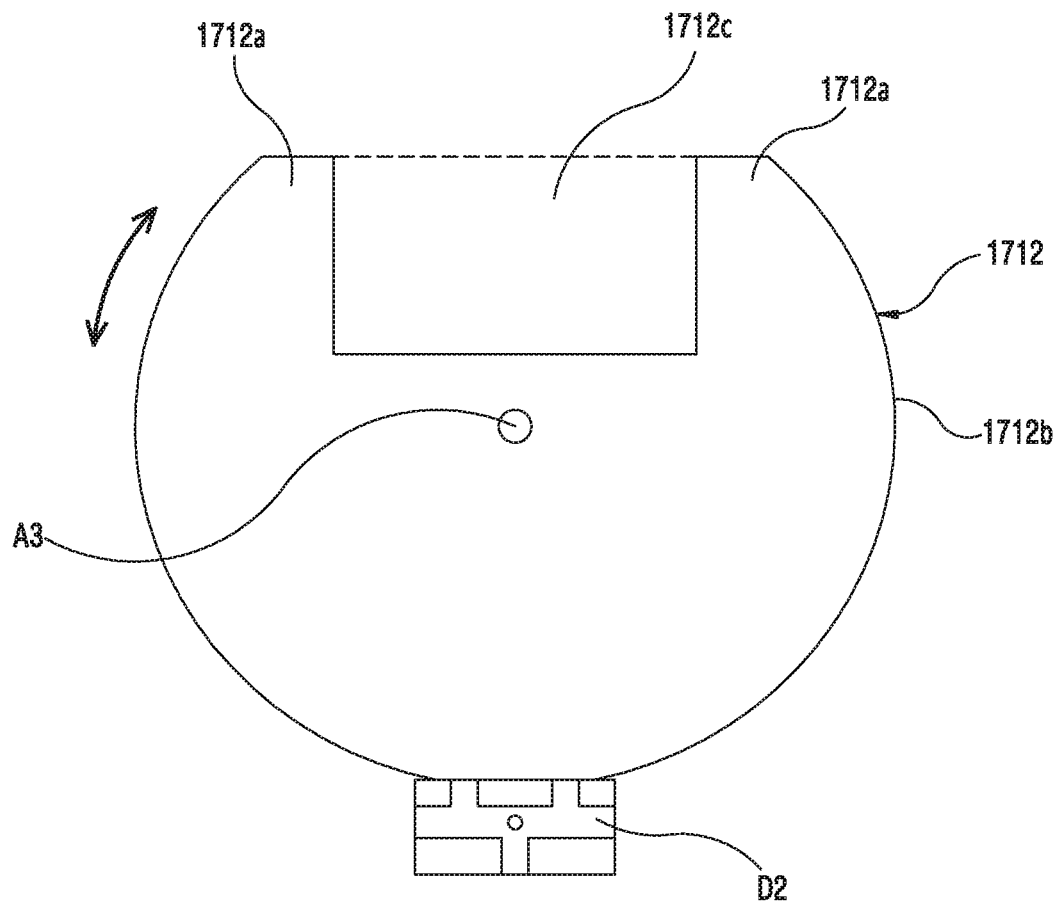
FIG. 17B is a front view showing the yawing housing and the yawing driving unit interlocked with each other according to various embodiments of the present disclosure.

Referring to FIGS. 17A and 17B, a yawing housing 1712 according to various embodiments may have a yawing driving unit D2 disposed along an outer circumference surface 1711$b$ thereof. The yawing housing 1712 interlocked with the yawing driving unit D2 may rotate around a third axis A3 according to the operation of the yawing driving unit D2. The yawing housing 1712 may include a spheric structure. A pitching housing may be housed in the spheric structure and rotated therein.

The yawing driving unit D2 according to various embodiments may include at least one piezoelectric element. For example, the yawing driving unit D2 may include a piezoelectric motor. The piezoelectric motor may be a piezo linear motor. The piezo linear motor may have a superhigh speed and a superprecision position control function. The yawing housing 1712 may include a pair of connection arms 1712A to be coupled to the pitching housing. An opened space 1712$c$ may be disposed between the pair of connection arms 1712$a$ to house the pitching housing.

Figure 18A:
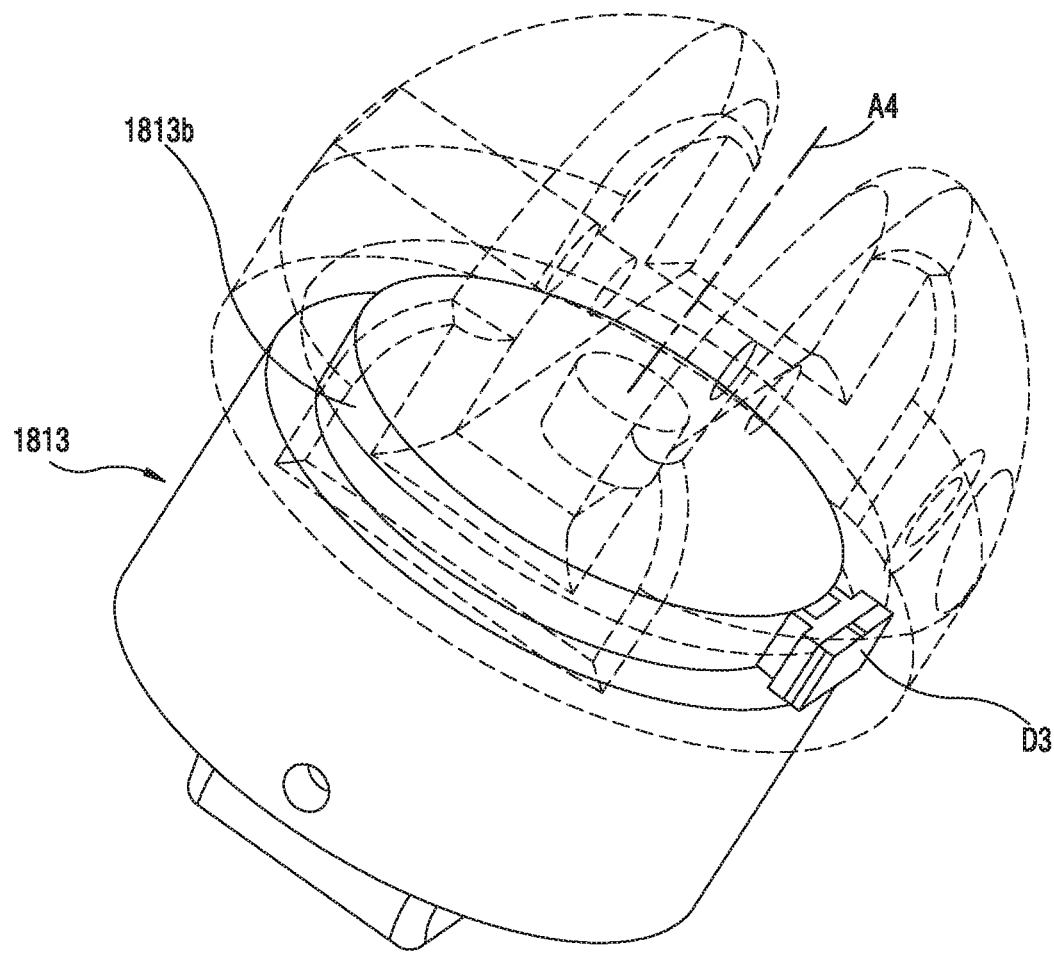
FIG. 18A is a perspective view showing a rolling housing and a rolling driving unit which are interlocked with each other according to various embodiments of the present disclosure.
Figure 18B:
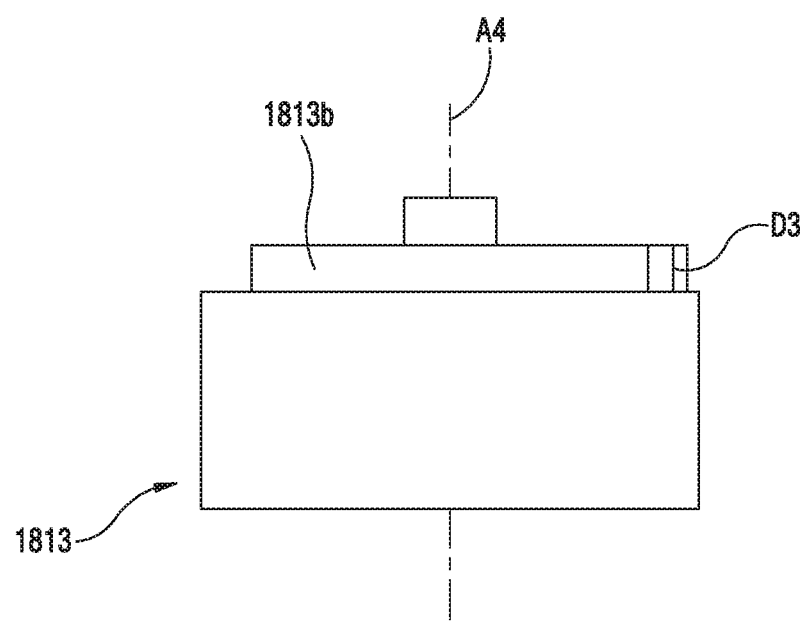
FIG. 18B is a front view showing a mounting state of the rolling housing and the rolling driving unit according to various embodiments of the present disclosure.

Referring to FIGS. 18A and 18B, a rolling housing 1813 according to various embodiments may have a cylindrical shape and may have a rolling driving unit D3 disposed along an outer circumference surface 1813$b$ thereof. The rolling housing 1813 interlocked with the rolling driving unit D2 may rotate around a fourth axis A4 according to the operation of the rolling driving unit D3.

The rolling driving unit D3 according to various embodiments may include at least one piezoelectric element. For example, the rolling driving unit D3 may include a piezoelectric motor. The piezoelectric motor may be a piezo linear motor. The piezo linear motor may have a superhigh speed and a superprecision position control function.

Figure 19A:
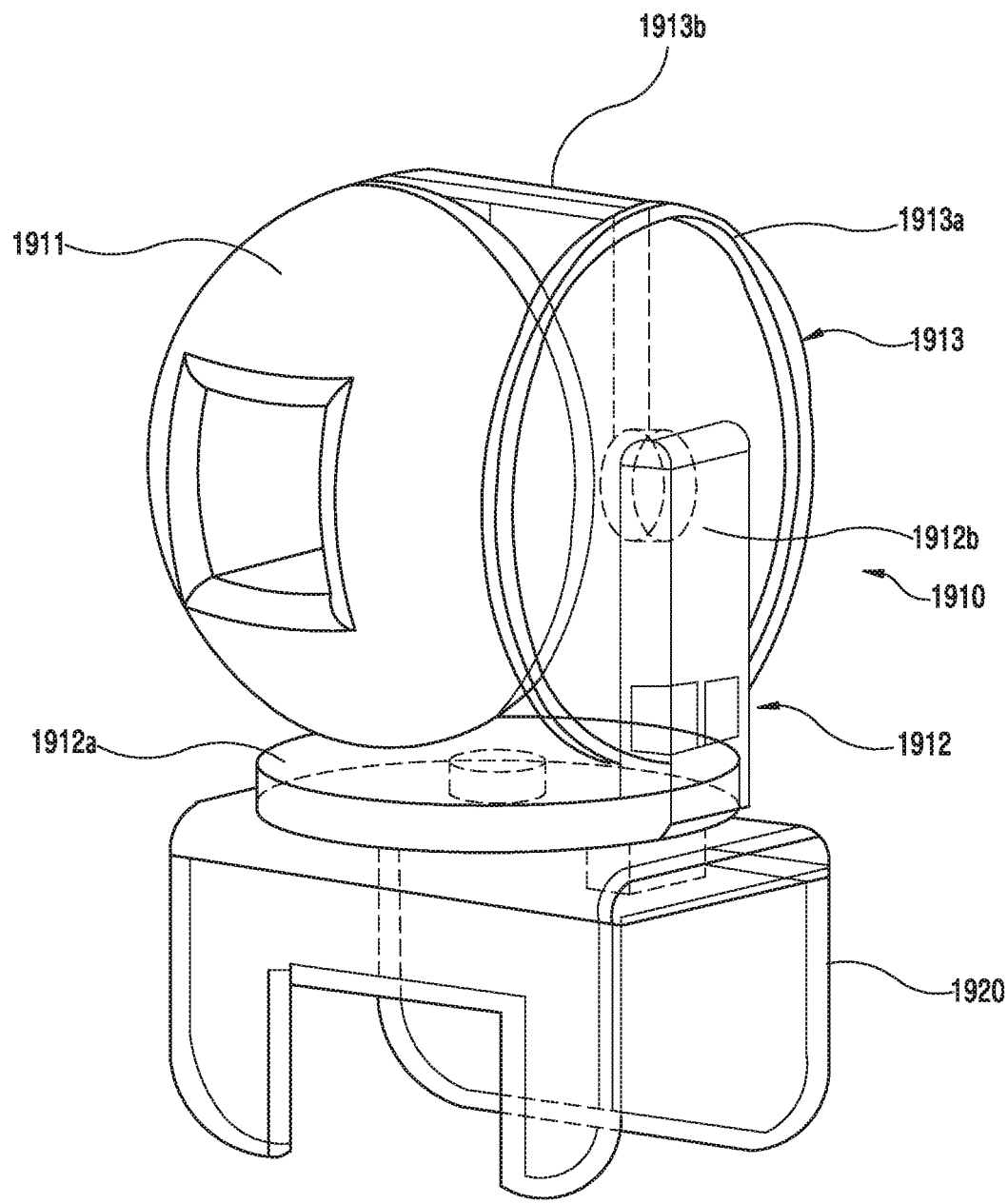
FIG. 19A is a perspective view showing a gimbal according to various embodiments of the present disclosure.
Figure 19B:
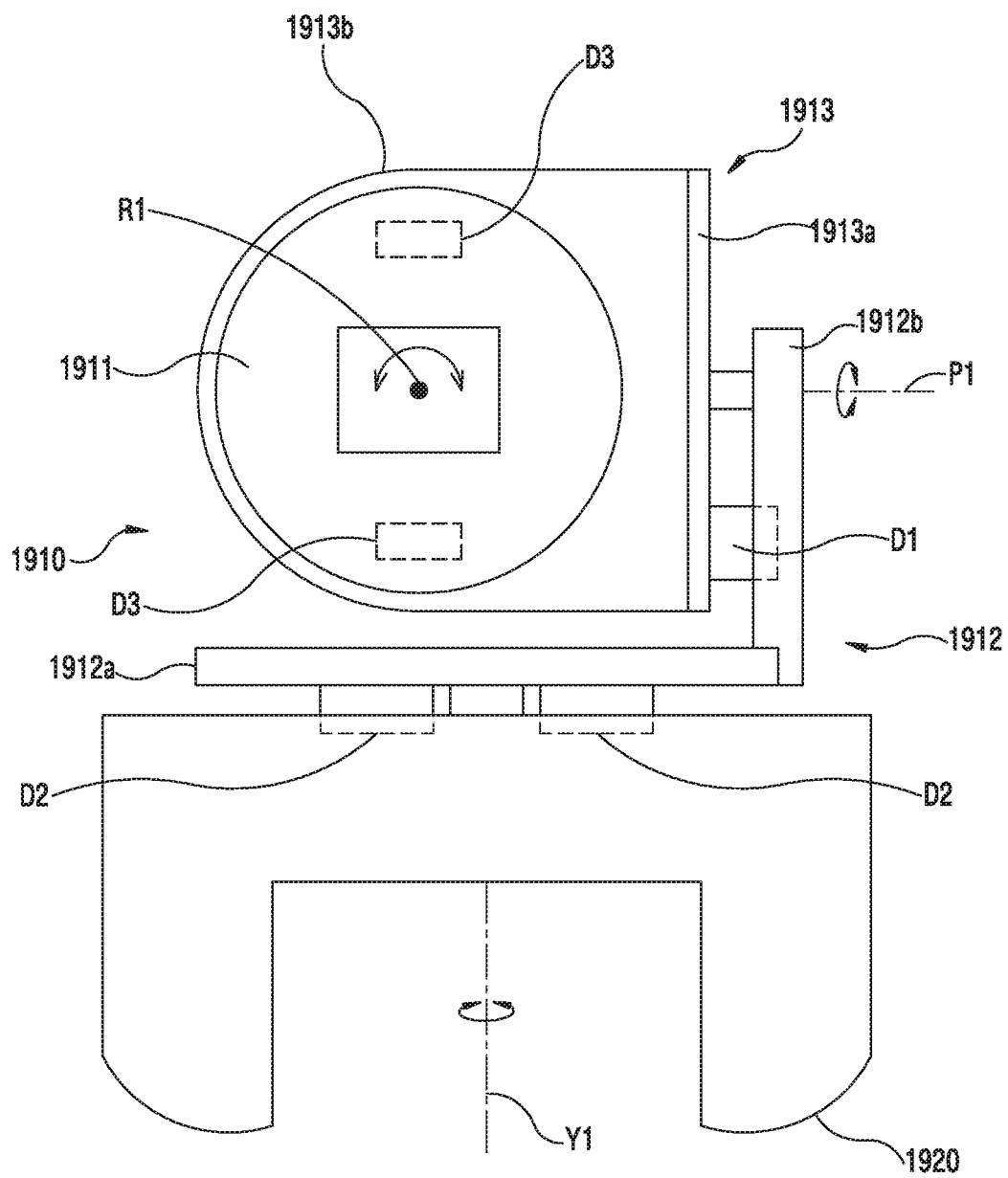
FIG. 19B is a side view showing the gimbal according to various embodiments of the present disclosure.

Referring to FIGS. 19A and 19B, a gimbal 1910 according to various embodiments may include a first frame 1912 rotating around a second axis Y, a second frame 1913 rotating around a first axis P1, and a lens housing 1911 rotating around a third axis R1. The first axis P1 may be a pitching axis, the second axis Y1 may be a yawing axis, and the third axis R1 may be a rolling axis.

The first frame 1912 according to various embodiments may include first and second support members 1912$a$, 1912$b$. The first support member 1912$a$ may be a disk support in a parallel state that is coupled to a holder 1920 to be rotatable around the second axis Y1. The second support member 1912$b$ according to various embodiments may be a portion that vertically extends from the first support member 1912$a$ in one direction, and allows the second frame 1913 to be coupled thereto to be rotatable around the first axis P1.

The second frame 1913 according to various embodiments may include first and second support members 1913$a$, 1913$b$. The first support member 1913$a$ of the second frame is a substantially disk shape, and may be coupled to the second support member 1912$b$ of the first support (frame?) to be rotatable around the first axis A1. The second support member 1913*b* according to various embodiments may be a plate that vertically extends from a point where the first support member 1913*a* is divided into an upper portion and a lower portion in the vertical direction, and may be disposed to allow the lens housing 1911 to rotate around the third axis R1.

The gimbal 1910 according to various embodiments may include a plurality of driving units D1-D3 for rotating the lens housing 1911 and the first and second frames 1912, 1913, respectively. For example, the driving units may include a pitching driving unit D1, a yawing driving unit D2, and a rolling driving unit D3.

The pitching driving unit D1 according to various embodiments may be disposed on the second support member 1912*b* of the first frame and may be disposed to be interlocked with the first support member 1913*a* of the second frame. For example, the first support member 1913A of the second frame may rotate around the first axis P1, and the lens housing 1911 may rotate around the first axis P1 according to the operation of the pitching driving unit D3.

The pitching driving unit D1 according to various embodiments may include at least one piezoelectric element. For example, the pitching driving unit D1 may include a piezoelectric motor. The piezoelectric motor may be a piezo linear motor. The piezo linear motor may have a superhigh speed and a superprecision position control function. For example, a stepping motor may be used instead of the piezoelectric motor. When the stepping motor is used, a portion interlocked with the stepping motor may form gear teeth.

According to various embodiments, one or more yawing driving units D2 may be disposed on a portion of the holder 1920 disposed to face the first support member 1912*a* of the first frame. The yawing driving units D2 according to various embodiments may by symmetrically disposed on portions of the holder 1290 in pair with reference to the second axis Y1. The yawing driving units D2 may be disposed to be interlocked with the first support member 1912*a* of the first frame. The support member 1912*a* of the first frame may rotate around the second axis Y1 according to the operation of the yawing driving units D2.

The yawing driving unit D2 according to various embodiments may include at least one piezoelectric element. For example, the yawing driving unit D2 may include a piezoelectric motor. The piezoelectric motor may be a piezo linear motor. The piezo linear motor may have a superhigh speed and a superprecision position control function. For example, a stepping motor may be used instead of the piezoelectric motor. When the stepping motor is used, a portion interlocked with the stepping motor may form gear teeth.

According to various embodiments, one or more rolling driving units D3 may be disposed on the second support member 1913*b* of the second frame. For example, the rolling driving units D3 may be disposed to be interlocked with the lens housing 1911. The rolling driving unit D3 may be disposed on the bottom surface of the lens housing 1911 to be interlocked with the lens housing 1911. The rolling units D3 may be arranged in pair with reference to the third axis R1.

The rolling driving unit D3 according to various embodiments may include at least one piezoelectric element. For example, the rolling driving unit D3 may include a piezoelectric motor. The piezoelectric motor may be a piezo linear motor. The piezo linear motor may have a superhigh speed and a superprecision position control function. For example, a stepping motor may be used instead of the piezoelectric motor. When the stepping motor is used, a portion interlocked with the stepping motor may form gear teeth.

The lens housing 1911 according to various embodiments may include a substantially hemispheric structure, and may include a lens module (not shown), and may rotate around the first, second, and third axes P1, Y1, R1, and may automatically adjust an amount of three-axis rotation by the pitching driving unit D1, the yawing driving unit D2, and the rolling driving unit D3.

Figure 20A:
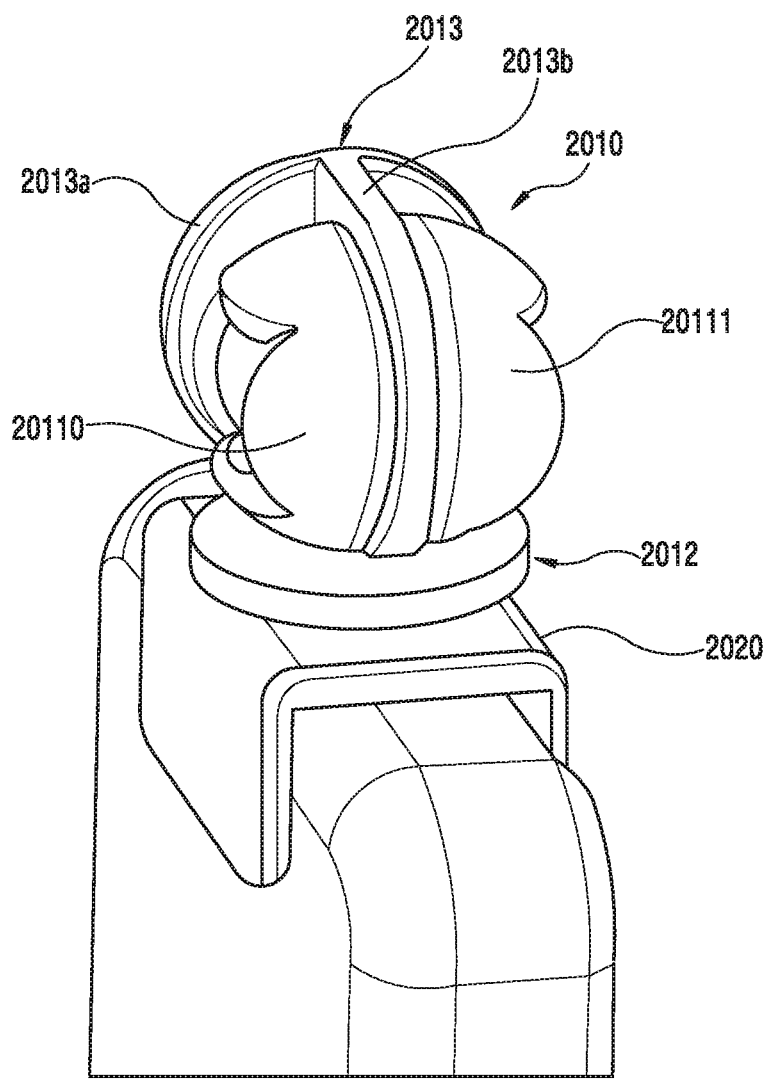
FIG. 20A is a perspective view showing a gimbal which is mounted on an electronic device according to various embodiments of the present disclosure.
Figure 20B:
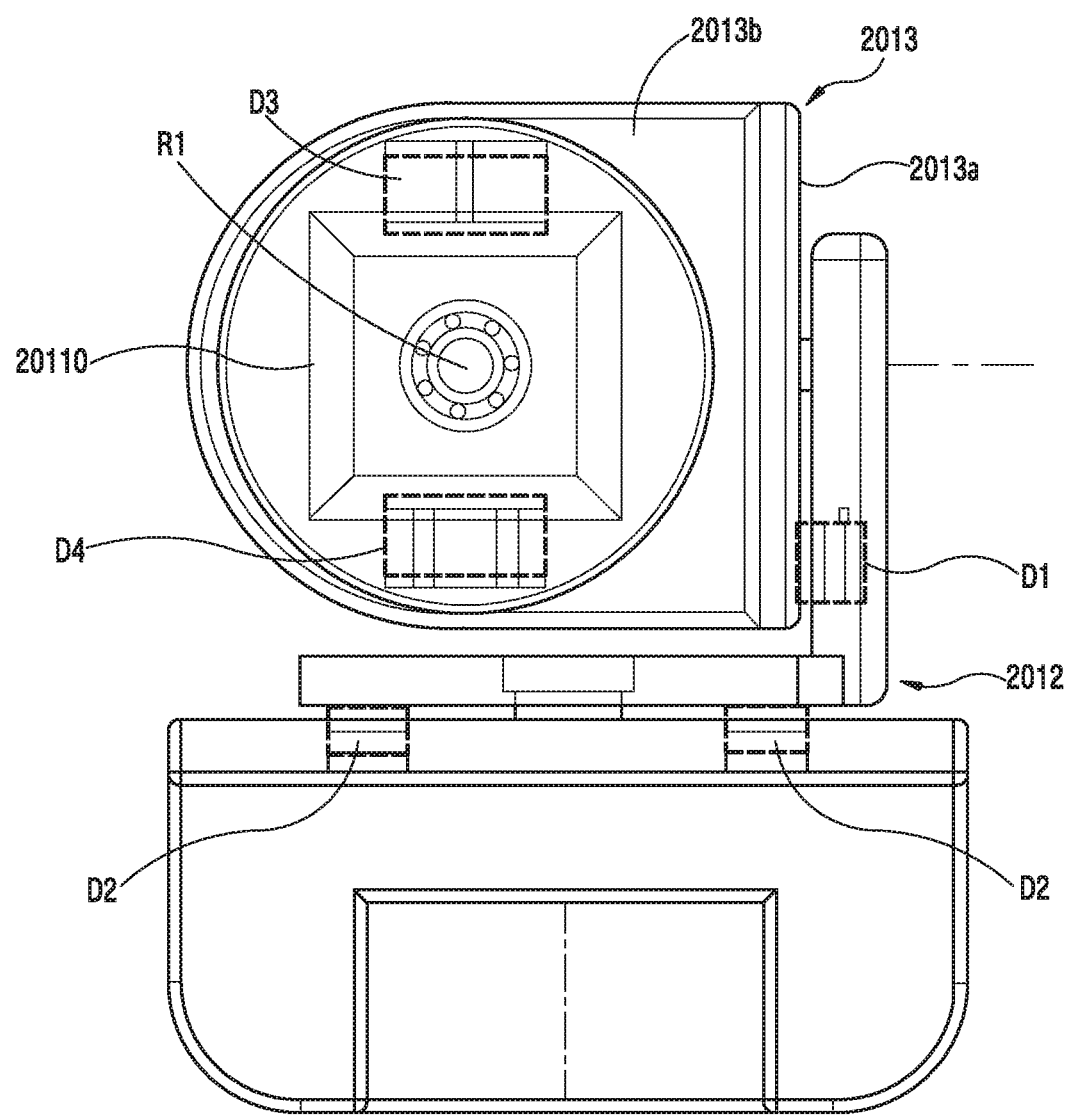
FIG. 20B is a side view showing the gimbal mounted on the electronic device according to various embodiments of the present disclosure.
Figure 20C:
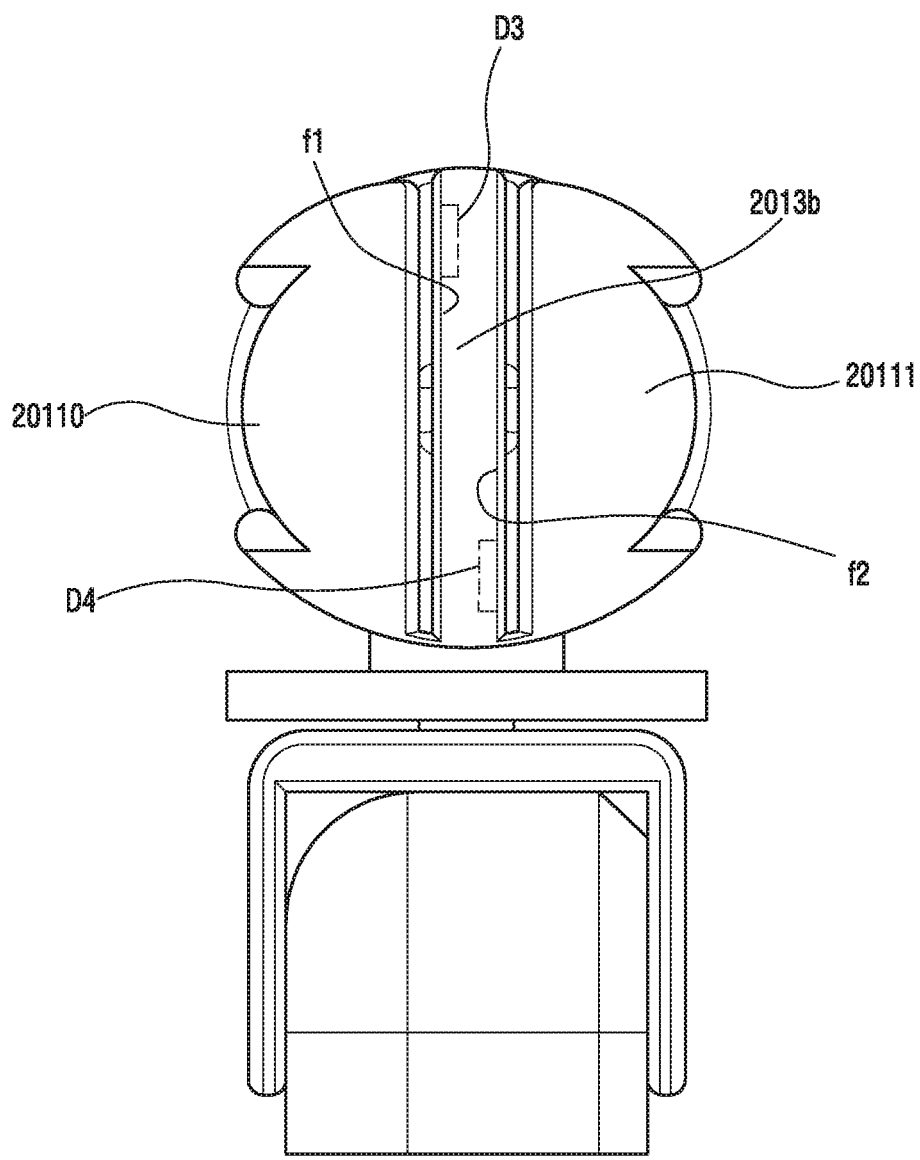
FIG. 20C is a rear view showing the gimbal mounted on the electronic device according to various embodiments of the present disclosure.

Referring to FIGS. 20A and 20B (20C?), a gimbal 2010 according to various embodiments may include a first frame 2012 rotating around a second axis Y1, a second frame 2013 rotating around a first axis P1, and first and second lens housings 20110, 20111 rotating around a third axis R1. The first axis P1 may be a pitching axis, the second axis Y1 may be a yawing axis, and the third axis R1 may be a rolling axis.

Since the first frame 2012 according to various embodiments has the same configuration as that of the first frame 1912 shown in FIGS. 19A and 19B, a detailed description thereof is omitted. Since the second frame 2013 according to various embodiments has the same configuration as that of the third frame 1913 shown in FIGS. 19A and 19B, a detailed description thereof is omitted.

The gimbal 1910 according to various embodiments may have a plurality of driving units D1-D4 for rotating the first and second lens housings 20110, 20111 and the first and second frames 2012, 2013, respectively. For example, the driving units may include a pitching driving unit D1, a yawing driving unit D2, and first and second rolling driving units D3, D4.

Since the pitching driving unit D1 according to various embodiments has the same configuration as that of the pitching driving unit D1 shown in FIGS. 19A and 19B, a detailed description thereof is omitted. Since the yawing driving unit D2 according to various embodiments has the same configuration as that of the yawing driving unit D2 shown in FIGS. 19A and 19B, a detailed description thereof is omitted.

The gimbal 2010 according to various embodiments may have the first and second lens housings 20110, 20111 arranged therein to be able to photograph in both directions. The first and second lens housings 20110, 20111 according to various embodiments may be disposed on first and second surfaces f1, f2 of a second member 2013*b* of the second frame. The second frame 2013 may include first and second support members 2013*a*, 2013*b*, and the second support member 2013*b* may include the first surface f1 and the second face f2 opposite the first surface f1. The first lens housing 20110 may be disposed on the first surface f1, and the second lens housing 20111 may be disposed on the second surface f2.

The rolling driving units according to various embodiments may include first and second rolling driving units D3, D4. The first rolling driving unit D3 may be a driving power force for rotating the first lens housing 20110, and the second rolling driving unit D4 may be a driving force source for rotating the second lens housing 20111. The first rolling driving unit D3 may be disposed on the first surface f1 of the second support member, and may be disposed to be interlocked with the first lens housing 20110. The second rolling driving unit D4 may be disposed on the second surface f2 of the second support member, and may be disposed to be interlocked with the second lens housing 20111. The first lens housing 20110 may be a front facing camera of the electronic device, and the second lens housing 20111 may be a rear facing camera of the electronic device. The first and second rolling driving units D3, D4 may be independently controlled and operated.

Figure 21A:
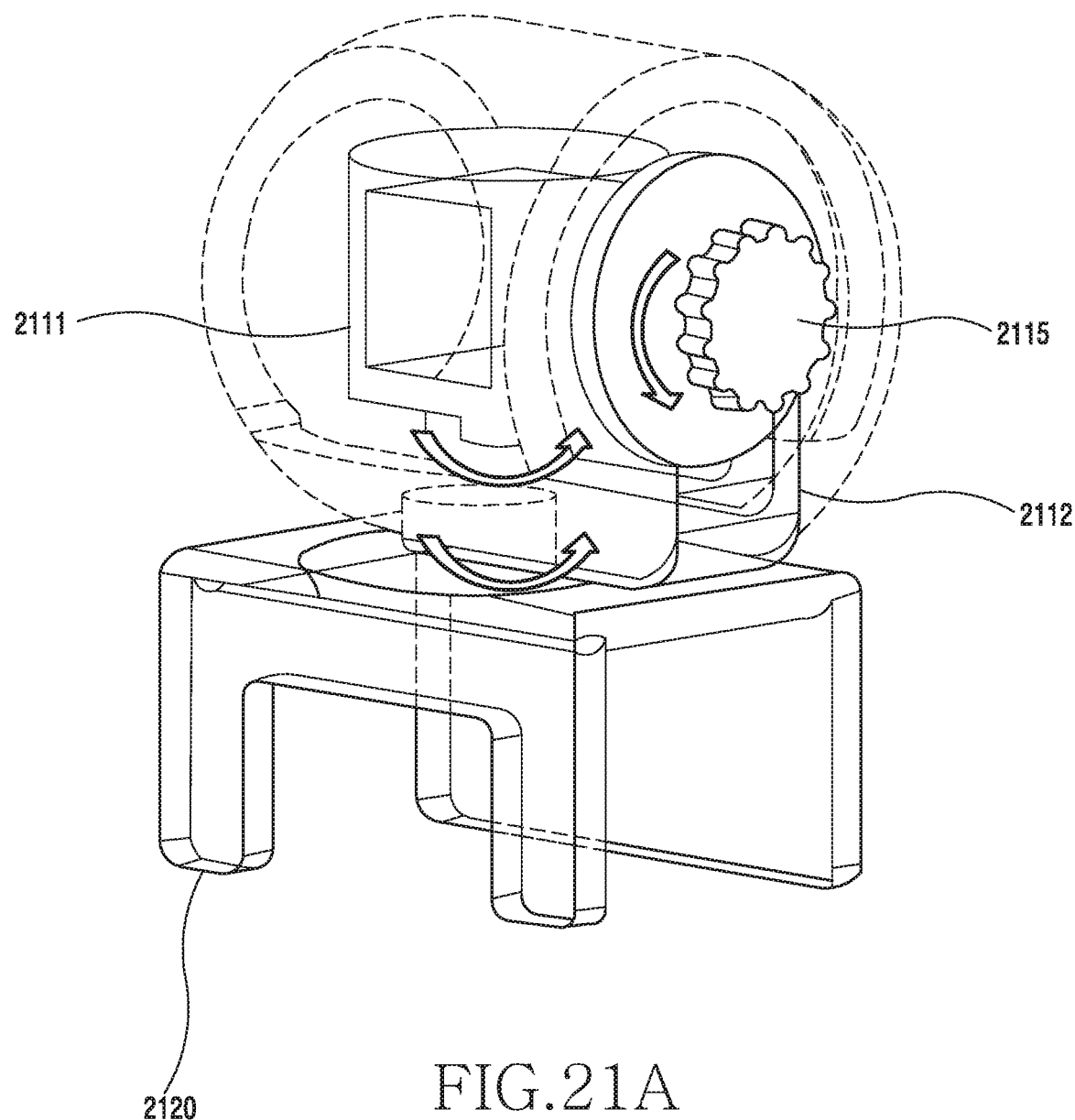
FIG. 21A is a perspective view showing a gimbal according to various embodiments of the present disclosure.
Figure 21B:
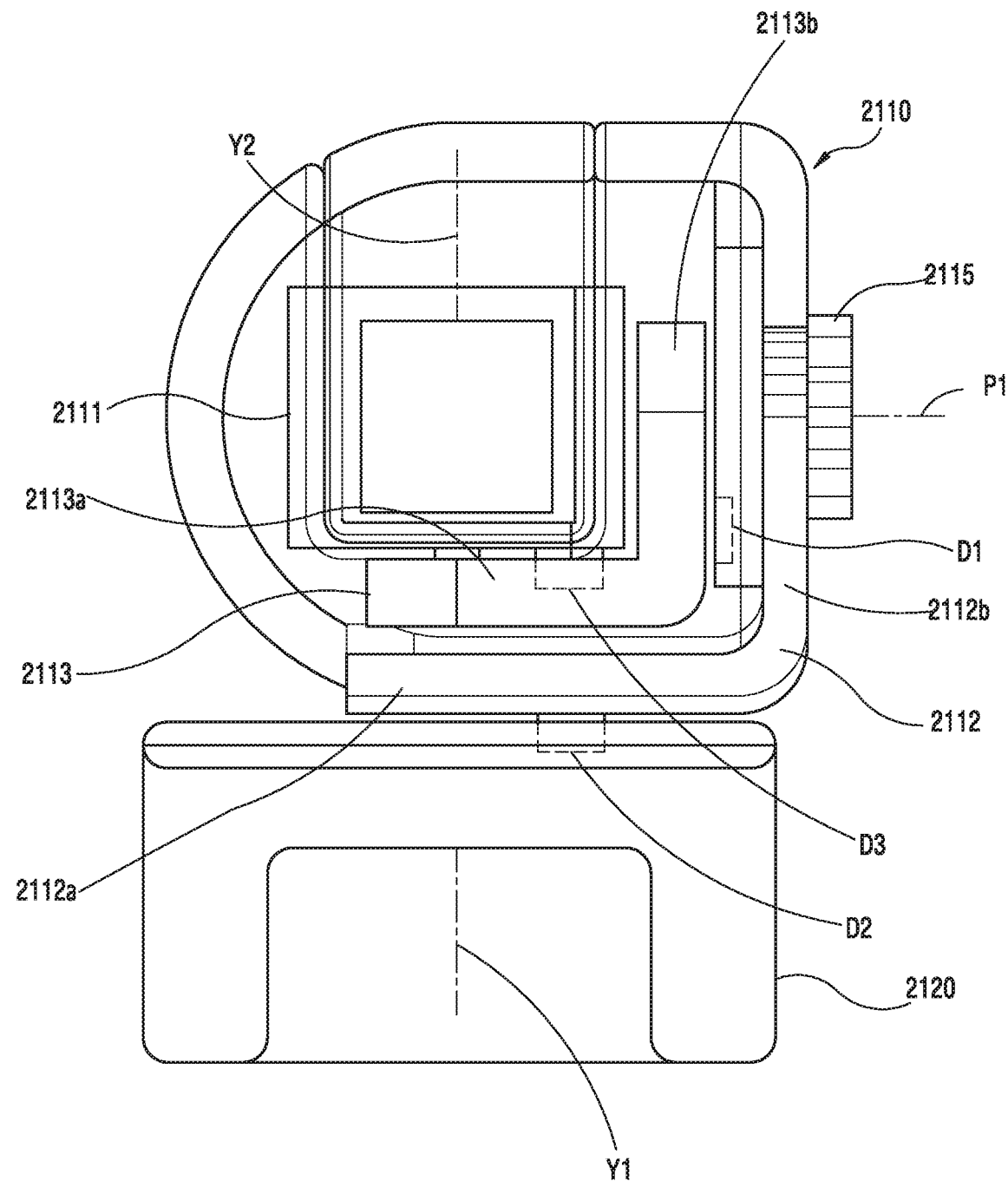
FIG. 21B is a side view showing the gimbal according to various embodiments of the present disclosure.
Figure 21C:
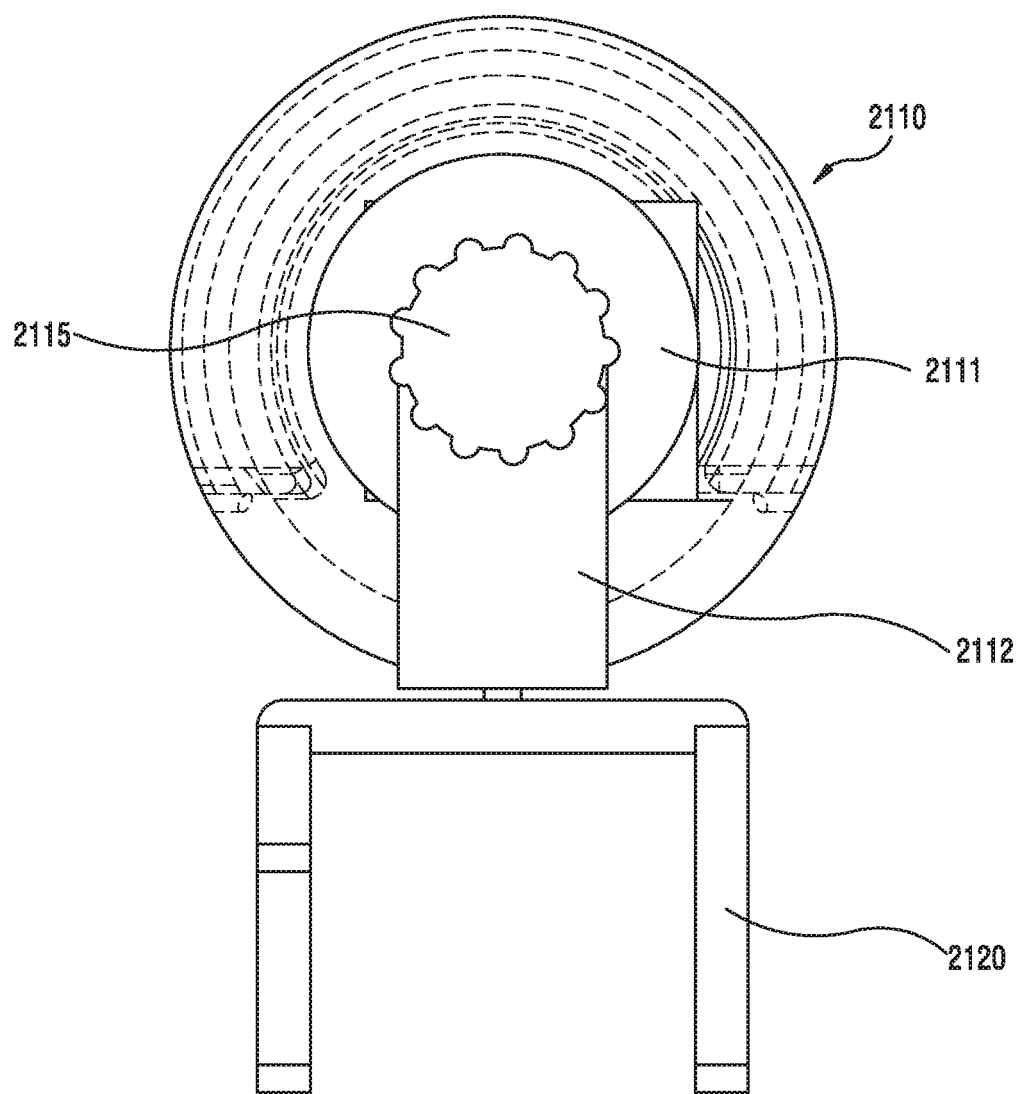
FIG. 21C is a rear view showing the gimbal according to various embodiments of the present disclosure.

Referring to FIGS. 21A to 21C, a gimbal 2110 according to various embodiments may include a first frame 2112 rotating around a second axis Y1, a second frame 2113 rotating around a first axis P1, and a lens housing 2111 rotating around a third axis Y2. The first axis P1 may be a pitching axis, and the second and third axes Y1, Y2 may be yawing axes. The gimbal 2110 according to various embodiments may not provide a rolling axis.

The first frame 2112 according to various embodiments may include first and second support members 2112a, 2112b. The first support member 2112a may be a disk support in a parallel state that is coupled to a holder 2120 to be rotatable around the second axis Y1. The second support member 2112b according to various embodiments is a portion that vertically extends from the first support member 2112a in one direction, and allows the second frame 2113 to be coupled thereto to be rotatable around the first axis P1.

The second frame 2113 according to various embodiments may include first and second support members 2113a, 2113b. The first support member 2113a of the second frame may have a substantially disk shape, and may be coupled to the second support member 2112b of the first support to be rotatable around the first axis P1. The lens housing 2111 may be coupled onto the first support member 2113a to be rotatable around the third axis Y2.

The gimbal 2110 according to various embodiments may have a plurality of driving units D1-D3 disposed to rotate the lens housing 2111 and the first and second frames 2112, 2113, respectively. For example, the driving units may include a pitching driving unit D1, a first yawing driving unit D2, and a second yawing driving unit D3.

The pitching driving unit D1 according to various embodiments may be disposed on the second support member 2112b of the first frame, and may be disposed to be interlocked with the first support member 2113a of the second frame. For example, the first support member 2113a of the second frame may rotate around the first axis P1, and the lens housing 2111 may rotate around the first axis P1 according to the operation of the pitching driving unit D1.

The pitching driving unit D1 according to various embodiments may include at least one piezoelectric element. For example, the pitching driving unit D1 may include a piezoelectric motor. The piezoelectric motor may be a piezo linear motor. The piezo linear motor may have a superhigh speed and a superprecision position control function. For example, a stepping motor may be used instead of the piezoelectric motor. When the stepping motor is used, a portion interlocked with the stepping motor may form gear teeth.

According to various embodiments, one or more first yawing driving units D2 may be dispose on portions of the holder 2120 disposed to face the first support member 2112a of the first frame. The yawing driving units D2 may be disposed to be interlocked with the first support member 2112a of the first frame. The support member 2112a of the first frame may rotate around the second axis Y1 according to the operation of the yawing driving units D2.

The first yawing driving unit D2 according to various embodiments may include at least one piezoelectric element. For example, the first yawing driving unit D2 may include a piezoelectric motor. The piezoelectric motor may be a piezo linear motor. The piezo linear motor may have a superhigh speed and a superprecision position control function. For example, a stepping motor may be used instead of the piezoelectric motor. When the stepping motor is used, a portion interlocked with the stepping motor may form gear teeth.

According to various embodiments, one or more second yawing driving units D3 may be disposed on the first support member 2113a of the second frame. For example, the rolling driving unit D3 may be disposed to be interlocked with the lens housing 2111. The rolling driving unit D3 may be disposed on an outer surface of the lens housing 2111 to be interlocked with the lens housing 2111. The rolling driving units D3 may be disposed with reference to the third axis Y2.

The rolling driving unit D3 according to various embodiments may include at least one piezoelectric element. For example, the rolling driving unit D3 may include a piezoelectric motor. The piezoelectric motor may be a piezo linear motor. The piezo linear motor may have a superhigh speed and a superprecision position control function. For example, a stepping motor may be used instead of the piezoelectric motor. When the stepping motor is used, a portion interlocked with the stepping motor may form gear teeth.

The lens housing 2111 according to various embodiments may include a lens module (not shown), and may rotate around the first, second, and third axes P1, Y1, Y2, and may minutely adjust an amount of rotation by the pitching driving unit D1, the first yawing driving unit D2, and the second yawing driving unit D3.

The gimbal 2110 according to various embodiments may include an adjustment shaft 2115 for manually rotating the lens housing 2111 around the first axis P1. A front view, a top view, or a rear view of the lens housing may be selected by rotating the adjustment shaft.

The term "module," as used herein may represent, for example, a unit including a combination of one or two or more of hardware, software, or firmware. The "module" may be, for example, used interchangeably with the terms "unit", "logic", "logical block", "component", or "circuit" etc. The "module" may be the minimum unit of an integrally constructed component or a part thereof. The "module" may be also the minimum unit performing one or more functions or a part thereof. The "module" may be implemented mechanically or electronically. For example, the "module" may include at least one of an application-specific integrated circuit (ASIC) chip, Field-Programmable Gate Arrays (FPGAs) and a programmable-logic device performing some operations known to the art or to be developed in the future.

At least a part of an apparatus (e.g., modules or functions thereof) or method (e.g., operations) according to the present invention may be, for example, implemented as instructions stored in a computer-readable storage medium in a form of a programming module. In case that the instruction is executed by a processor (e.g., processor 120), and the processor may perform functions corresponding to the instructions. The computer-readable storage media may be the memory 130, for instance.

The computer-readable recording medium may include a hard disk, a floppy disk, and a magnetic medium (e.g., a magnetic tape), an optical medium (e.g., a Compact Disc-Read Only Memory (CD-ROM) and a Digital Versatile Disc (DVD)), a Magneto-Optical Medium (e.g., a floptical disk), and a hardware device (e.g., a Read Only Memory (ROM), a Random Access Memory (RAM), a flash memory, etc.). Also, the program instruction may include not only a mechanical language code such as a code made by a compiler but also a high-level language code executable by a computer using an interpreter, etc. The aforementioned hardware device may be constructed to operate as one or more software modules in order to perform operations of the present invention, and vice versa.

The module or programming module according to the present invention may include at least one or more of the aforementioned constituent elements, or omit some of the aforementioned constituent elements, or further include additional other constituent elements. Operations carried out by the module, the programming module or the other constituent elements according to the present invention may be executed in a sequential, parallel, repeated or heuristic method. Also, some operations may be executed in different order or may be omitted, or other operations may be added.

Accordingly, a method and electronic device are provided for controlling a display according to the present invention, to determine the priority of display based on a user's preference, thereby being able to decrease a search time for display and more quickly display a desired screen. While the present disclosure has been shown and described with reference to certain embodiments thereof, it will be apparent to those skilled in the art that the camera lens module according to the present disclosure is not limited to these embodiments, and various changes in form and details may be made therein without departing from the spirit and scope of the present disclosure as defined by the appended claims.

What is claimed is:

1. A camera gimbal comprising:
   a pitch housing having a lens unit disposed therein and configured to rotate around a first axis;
   a yaw housing configured to rotate around a third axis perpendicular to the first axis, and to which the pitch housing is coupled so as to be rotatable around the first axis; and
   a roll housing configured to rotate around a second axis perpendicular to the first and third axes, and to which the yaw housing is coupled so as to be rotatable around the third axis,
   wherein the first and second axes cross at a right angle to each other, the second and third axes cross at a right angle to each other, the first and third axes are spaced apart from each other in a state,
   wherein the roll housing has a hollow formed in a center thereof, and houses a portion of the yaw housing,
   wherein the first axis is a pitch axis, the second axis is a roll axis, and the third axis is a yaw axis;
   wherein, in a first position of the pitch housing, the lens unit is configured to photograph a front view in a horizontal direction photographic state, and, in a second position in which the pitch housinq rotates by 90 degrees from the first Position, the lens unit is configured to photograph a lower view oriented downwards from the front of the lens unit in a horizontal direction photographic state,
   wherein, in the second position, the photographing of the lens unit is not influenced by a shape of the yaw housing,
   wherein, in a third position of the pitch housing in which the roll housing rotates from the first position around the second axis by 90 degrees, the lens unit is configured to photograph a front in a vertical direction photographic state.

2. The camera gimbal of claim 1, wherein the pitch housing comprises a cylindrical portion formed on at least a portion thereof to be housed in the yaw housing,
   wherein another portion of the pitch housing, other than the cylindrical portion, is exposed from the yaw housing, and has an opening formed on a front surface thereof configured to allow the lens unit to photograph,
   wherein an outer circumference surface of at least a portion of the cylindrical portion is configured to be interlocked with a pitch driving unit, and
   wherein the interlocked portion comprises a gear engagement portion.

3. The camera gimbal of claim 1, wherein the pitch housing further comprises a first gear portion formed on a rear portion thereof, the yaw housing further comprises a second gear portion formed on a lower portion thereof, and the roll housing further comprises a third gear portion formed on an inner surface thereof.

4. The camera gimbal of claim 1, wherein the yaw housing comprises a spheric portion formed on at least a portion thereof, and is configured to rotate around the third axis with the pitch housing being housed in the spheric portion, and
   wherein another portion of the yaw housing other than the spheric portion is housed in the roll housing, and the third axis is disposed in the other portion.

5. The camera gimbal of claim 1, wherein:
   the pitch housing comprises a cylindrical portion formed on at least a portion thereof;
   the yaw housing comprises a spheric portion formed on at least a portion thereof;
   the roll housing comprises a hollow formed in at least a portion thereof; and
   wherein the gimbal further comprises a base,
   wherein the roll housing is housed in the base so as to be rotatable around the second axis.

6. The camera gimbal of claim 5, wherein the lens unit is configured to:
   photograph in a front horizontal direction state;
   photograph in a lower side horizontal direction state in which the lens unit rotates downwards by 90 degrees from the front horizontal direction state; and
   photograph in a front vertical direction state in which the lens unit rotates to a side by 90 degrees from the front horizontal direction state.

7. The gimbal of claim 6, wherein the roll housing houses a pitch driving unit and a yaw driving unit, a portion of the pitch driving unit is engaged with a portion of the pitch housing, the yaw driving unit is engaged with a portion of the yaw housing, the base houses a roll driving unit, and the driving unit is engaged with the roll housing.

* * * * *